US 11,131,355 B2

(12) United States Patent
White et al.

(10) Patent No.: US 11,131,355 B2
(45) Date of Patent: Sep. 28, 2021

(54) ABS TONE RING MOUNTING STRUCTURE

(71) Applicant: Hendrickson USA, L.L.C., Schaumburg, IL (US)

(72) Inventors: Jay D. White, North Canton, OH (US); Dhawal P. Dharaiya, Twinsburg, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 155 days.

(21) Appl. No.: 16/166,290

(22) Filed: Oct. 22, 2018

(65) Prior Publication Data

US 2019/0120312 A1 Apr. 25, 2019

Related U.S. Application Data

(60) Provisional application No. 62/576,115, filed on Oct. 24, 2017.

(51) Int. Cl.
*F16D 66/00* (2006.01)
*B60B 27/00* (2006.01)
(Continued)

(52) U.S. Cl.
CPC .......... *F16D 66/00* (2013.01); *B60B 27/0068* (2013.01); *B60T 8/329* (2013.01);
(Continued)

(58) Field of Classification Search
CPC ............. F16D 66/00; F16D 2200/0021; F16D 2250/0046; F16D 2250/0084;
(Continued)

(56) References Cited

U.S. PATENT DOCUMENTS 5,053,656 A 10/1991 Hodge
5,166,611 A 11/1992 Kujawa, Jr. et al.
(Continued)

FOREIGN PATENT DOCUMENTS

DE 4445236 C1 3/1996
EP 0666478 B1 5/1998
(Continued)

*Primary Examiner* — Robert A. Siconolfi
*Assistant Examiner* — James K Hsiao
(74) *Attorney, Agent, or Firm* — Dureska & Moore, LLC; David P. Dureska; David J. Danko

(57) ABSTRACT

Tone ring mounting structure for an antilock braking system comprising a wheel end assembly rotatable component having at least a first end surface and a first engagement mechanism extending radially and non-cantilevered from the rotatable component, and a tone ring having a second end surface and a second engagement mechanism extending radially from the tone ring. Connecting engagement of the first engagement mechanism of the wheel end assembly rotatable component and the second engagement mechanism of the tone ring affects movement of the second end surface in a direction toward the first end surface. The first engagement mechanism and the second engagement mechanism can be engageable threads. The first engagement mechanism can include lugs formed on the wheel end assembly rotatable component and the second engagement mechanism threads or wedge ramps engageable with the lugs. A corrosion resistant coating can be applied to components of the tone ring mounting structure.

30 Claims, 21 Drawing Sheets

(51) Int. Cl.
  *B60T 8/32*  (2006.01)
  *B60T 17/22*  (2006.01)
  *G01D 5/14*  (2006.01)
  *G01P 3/488*  (2006.01)

(52) U.S. Cl.
  CPC ......... *B60T 17/22* (2013.01); *B60B 2310/616* (2013.01); *B60B 2320/10* (2013.01); *B60B 2360/10* (2013.01); *B60B 2360/102* (2013.01); *B60T 2250/04* (2013.01); *F16D 2066/003* (2013.01); *F16D 2200/003* (2013.01); *F16D 2200/0021* (2013.01); *F16D 2250/0046* (2013.01); *F16D 2250/0084* (2013.01); *G01D 5/147* (2013.01); *G01P 3/488* (2013.01)

(58) Field of Classification Search
  CPC ......... B60B 27/0068; B60B 2310/616; B60B 2320/10; B60B 2360/102; B60T 17/22; B60T 2250/04
  See application file for complete search history.

(56) References Cited

U.S. PATENT DOCUMENTS

| | | | |
|---|---|---|---|
| 5,476,272 A | 12/1995 | Hixson, II | |
| 6,467,588 B1 | 10/2002 | Baumgartner et al. | |
| 6,498,475 B2 | 12/2002 | Foster et al. | |
| 6,568,512 B1 | 5/2003 | Tolani | |
| 6,619,440 B2 | 9/2003 | Antony et al. | |
| 6,642,709 B2 | 11/2003 | Heimann, Jr. et al. | |
| 7,219,778 B2 | 5/2007 | Pete et al. | |
| 7,306,293 B2 | 12/2007 | Redgrave | |
| 7,487,862 B2 | 2/2009 | Carlson et al. | |
| 7,779,969 B2 | 8/2010 | Gonska | |
| 7,980,367 B2 * | 7/2011 | Hester | B60T 8/329 188/218 XL |
| 7,997,391 B2 | 8/2011 | Burgoon et al. | |
| 8,020,676 B2 | 9/2011 | Bradley et al. | |
| 8,287,052 B2 | 10/2012 | Fakhoury et al. | |
| 8,584,815 B2 * | 11/2013 | Hester | F16D 65/12 188/218 XL |
| 8,613,347 B2 | 12/2013 | Pahle | |
| 9,291,227 B2 | 3/2016 | Burgoon et al. | |
| 9,506,515 B2 | 11/2016 | White et al. | |
| 9,759,281 B1 * | 9/2017 | Stratton | F16D 66/00 |
| 9,765,833 B2 | 9/2017 | Burgoon et al. | |
| 9,976,611 B2 | 5/2018 | Burgoon | |
| 2003/0052562 A1 * | 3/2003 | Antony | B60T 1/065 310/168 |
| 2006/0091723 A1 * | 5/2006 | Pete | G01D 5/00 303/113.1 |
| 2006/0272906 A1 * | 12/2006 | Gonska | B60T 8/329 188/218 XL |
| 2006/0272909 A1 * | 12/2006 | Fuller | C23C 4/04 188/251 A |
| 2007/0273362 A1 | 11/2007 | Nakajima et al. | |
| 2008/0099288 A1 * | 5/2008 | Burgoon | F16D 66/00 188/218 XL |
| 2009/0188762 A1 | 7/2009 | Hester | |
| 2009/0218183 A1 * | 9/2009 | Burgoon | F16D 65/12 188/218 XL |
| 2011/0067963 A1 * | 3/2011 | Pahle | F16D 65/12 188/218 XL |
| 2011/0209562 A1 * | 9/2011 | Ono | B60B 27/0094 73/862.045 |
| 2012/0192636 A1 * | 8/2012 | Norimatsu | F16C 33/7876 73/115.07 |
| 2015/0021128 A1 * | 1/2015 | White | F16D 65/128 188/218 XL |
| 2016/0153848 A1 | 6/2016 | Rousselin et al. | |
| 2017/0074336 A1 | 3/2017 | Burgoon | |
| 2017/0122390 A1 * | 5/2017 | Maronati | F16D 65/125 |
| 2018/0290637 A1 * | 10/2018 | White | B60T 8/54 |
| 2018/0313417 A1 * | 11/2018 | White | F16D 65/0025 |

FOREIGN PATENT DOCUMENTS

| | | |
|---|---|---|
| EP | 1088725 A1 | 4/2001 |
| EP | 1762743 A2 | 3/2007 |
| EP | 1918605 A1 | 5/2008 |

\* cited by examiner

INBOARD   OUTBOARD

ABS TONE RING MOUNTING STRUCTURE

CROSS-REFERENCE TO RELATED APPLICATION

This application claims the benefit of U.S. Provisional Patent Application Ser. No. 62/576,115, filed on Oct. 24, 2017.

BACKGROUND

Technical Field

The subject matter of this application relates generally to vehicle antilock braking systems (ABS). In particular, the subject matter relates to structure for mounting an antilock braking system tone ring to a rotatable wheel end component.

Background

Antilock braking systems (ABS) are common equipment on many types of vehicles ranging from automobiles to heavy-duty vehicles. Heavy-duty vehicles include tractors, trailers, trucks, semi-trailers, and the like. Typically, in a heavy-duty vehicle at least one axle of the heavy-duty vehicle incorporates components of an antilock braking system on each end of that axle. Some manufacturers of heavy-duty vehicles incorporate components of an antilock braking system at the ends of every axle on the heavy-duty vehicle.

The antilock braking system for a heavy-duty vehicle typically includes a sensor located adjacent to a wheel end assembly. The wheel end assembly has at least one component, such as a disc brake rotor and/or a wheel hub, rotatably mounted on a spindle that is fixed to a central tube of the axle. The antilock braking assembly also includes a tone ring/exciter wheel mounted to, or formed on, the rotatable component of the wheel end assembly associated with each antilock braking assembly sensor. For example, the tone ring may be a separate component attached to an inboard portion of the disc brake rotor or an inboard portion of the wheel hub, or the tone ring may be integrally incorporated into the disc brake rotor or the wheel hub.

The tone ring is generally annular and includes a plurality of notches, protrusions, or similar divisions, defining a plurality of evenly spaced teeth. The teeth may extend radially or axially from the tone ring. The teeth of the tone ring are formed of a material capable of disrupting magnetic fields which are produced by and detected by the antilock braking sensor. Tone rings are often formed from a metal material containing iron for the magnetic field disruption as each tooth passes the sensor and are subject to corrosion. The tone rings may also be made by relatively expensive methods such as casting or molding from sintered powdered metal.

The tone ring rotates with the disc brake rotor or wheel hub. The antilock braking assembly sensor is attached to the vehicle axle, or other stationary vehicle component. The antilock braking assembly sensor is in close proximity to the tone ring. The antilock braking assembly sensor detects the magnetic field disruption caused by each of the plurality of teeth passing by the sensor. An electrical signal indicative of the detected disruption is sent to an antilock braking system electronic control unit to calculate or determine meaningful data, such as distance travelled, rotational velocity of the tone ring and/or change in rotational velocity of the tone ring. Such meaningful data from every sensor on the vehicle is compared and used to control brake engagement.

In some heavy-duty disc brake assemblies, the tone ring is mounted to and retained in place on the disc brake rotor by prior art mounting structure. Prior art mounting structure may include radially extending bosses of the tone ring inserted into grooves formed in respective lugs of the disc brake rotor. At least one of the bosses has a stop surface or tab that engages a side of the lug in order to prevent relative rotational movement of the tone ring in a first direction. In order to assure that the bosses do not detach from the grooves in the lugs, at least one boss has an opening that receives a device, such as a roll pin, that engages the side of the lug opposite of the side engaged by the tab to prevent relative rotational movement in a second direction opposite the first direction.

These roll pins are typically made of a ferrous metal that tends to corrode. A corroded roll pin becomes challenging to remove from the opening in the boss, making it difficult to detach the tone ring from the disc brake rotor for servicing or replacement. The bosses of the tone ring may also have a wedge-shape spacer or shim formed on a surface of each boss. Once the bosses are seated in respective lugs, the spacer or shim occupies a space between the boss and an end of the walls of the lug to limit or eliminate relative axial movement between the tone ring and the rotor. These wedge-shape spacers or shims generally are formed and located so an apex may be outside the end of a respective lug. In the case where a separate discrete tone ring is mounted to the disc brake rotor, some spaces, gaps or voids may exist in regions where the components connect.

Tone rings, whether attached to, or integrated with, a vehicle wheel hub or disc brake rotor, are exposed to the environment under the heavy-duty vehicle, which in certain situations, can negatively impact the effectiveness of the vehicle antilock braking system. For example, it is known that road spray may include salt or other anti-icing or de-icing chemicals present on a road surface. Salt from salt water is often present on roads near a sea, and roads in areas with abundant ice or snow are often treated with certain chemicals for anti-icing or de-icing. Such anti-icing or de-icing chemicals can include sodium chloride, calcium chloride, magnesium chloride, and mixtures thereof. Road spray, salt, and/or other chemicals can collect on the disc brake rotor and/or tone ring.

Spaces or voids may exist between the tone ring and the disc brake rotor. Some relative movement may occur between the tone ring and disc brake rotor. Such relative movement may result in a capillary action and cause the road spray, salt and/or other anti-icing or de-icing chemicals to be pumped or forced into those spaces or voids. The salts and other anti-icing or de-icing chemicals remaining after water or other solvents evaporate can cause corrosion cells which may evolve into rust-jacking that can damage the tone ring and/or rotor. This damage can lead to a fault in the antilock braking system, requiring the vehicle to be serviced, resulting in vehicle down time. Rust-jacking is often found in the spaces, gaps or voids existing between the tone ring and disc brake rotor. Rust-jacking may result in a net volume expansion of the rust or oxidation. Some prior art wheel hubs or disc brake rotors have an inboard portion with a cantilevered region in the lugs to retain the tone ring. This cantilevered region may be subject to damage due to the net volume expansion associated with corrosion cell formation and rust-jacking.

In other attachment schemes, a steel or sintered tone ring may be press fit into a cast iron-based disc brake rotor. The disc brake rotor typically experiences relatively higher temperatures during operation than the tone ring. The disk brake rotor may thermally expand more than the tone ring because of the different materials. The tone ring may loosen or disengage from the disc brake rotor and cause the ABS to become nonfunctional or unreliable.

The drawbacks, limitations and disadvantages of prior art tone ring mounting structures of disc brake rotors, wheel hubs and tone rings resulting from corrosion and from complex structures need to be addressed. Thus, there is a need for a tone ring mounting structure which minimizes the potential for damage to the disc brake rotor, wheel hub and/or tone ring from corrosion during operation of the vehicle. There is also a need for a tone ring mounting structure that can accommodate components that experience varying degrees of thermal expansion during vehicle braking.

SUMMARY

A summary is provided to introduce concepts of the disclosed subject matter. The summary is not intended to identify key factors or essential features of the disclosed subject matter, nor is it intended to limit the scope of the disclosed subject matter.

An improved tone ring mounting structure for an antilock braking system, according to an aspect of the disclosed subject matter, addresses the need and overcomes the drawbacks, limitations and disadvantages of the prior art tone ring mounting structures. For example, the improved tone ring mounting structure of the disclosed subject matter reduces the potential for damage to the disc brake rotor, wheel hub and/or tone ring from corrosion.

According to an aspect, an improved tone ring mounting structure for an antilock braking system is utilized with heavy-duty vehicles. The tone ring is formed from readily available tubular metal material, such as tube steel. The tone ring mounting structure includes a wheel end assembly rotatable component having at least one first end surface and a first engagement mechanism. A tone ring is formed with at least one second end surface and a second engagement mechanism. Connecting engagement of the first engagement mechanism of the wheel end assembly rotatable component and the second engagement mechanism of the tone ring affects movement of the at least one second end surface in a direction toward the at least one first end surface.

The first engagement mechanism extends radially and non-cantilevered from the wheel end assembly rotatable component. The first engagement mechanism may be a thread. The second engagement mechanism extends radially from the tone ring. The second engagement mechanism may be a thread.

The tone ring mounting structure further includes threaded engagement of the first engagement mechanism of the wheel end assembly rotatable component and the second engagement mechanism of the tone ring. The threaded engagement of the first engagement mechanism and the second engagement mechanism forces at least one second end surface against the at least one first end surface to inhibit relative axial movement in a first direction and relative rotational movement between the tone ring and the wheel end assembly rotatable component. Securing structure prevents relative rotational movement between the tone ring and the wheel end assembly rotatable component. The securing structure comprises a device connecting the tone ring and the wheel end assembly rotatable component. The device comprises a mechanism inserted into the wheel end assembly rotatable component and the tone ring.

At least one first end surface may be a substantially continuous end surface. The at least one first end surface can be annular or frusto-conical. At least one first end surface can include a plurality of end surfaces formed on a plurality of circumferentially spaced lugs formed on the wheel end assembly rotatable component. The plurality of end surfaces may extend substantially in the same plane.

The wheel end assembly rotatable component may be a disc brake rotor. The wheel end assembly rotatable component may also be a wheel hub. The engagement mechanisms can be ramp or wedge structure. The first thread of the wheel end assembly rotatable component can comprise an internal thread and the second thread of the tone ring comprises an external thread. Conversely, the first thread of the wheel end assembly rotatable component can comprise an external thread and the second thread of the tone ring comprises an internal thread.

According to another aspect, a method of manufacturing a wheel end assembly includes the steps of providing a wheel end assembly rotatable component with at least one first end surface and a first thread. A tone ring is provided and formed with at least one second end surface and a second thread. The second thread of the tone ring is threaded into the first thread of the wheel end assembly rotatable component. At least one second end surface is moved in a direction toward the at least one first end surface during the threading step.

The threading step and moved step further include moving at least one second end surface against at least one first end surface to inhibit relative axial movement in a first direction and relative rotational movement between the tone ring and the wheel end assembly rotatable component. The method further includes the step of introducing securing structure to prevent relative rotational movement between the tone ring and the rotatable component. Providing the tone ring further includes cutting a blank from tubular material. A plurality of teeth are formed on an axial end surface of the blank. A thread is formed on a cylindrical surface of the blank.

At least a portion of at least one of the tone ring and the wheel end assembly rotatable component may include a corrosion resistant coating. The corrosion resistant coating may be a zinc-rich coating. The zinc-rich coating can be a zinc-nickel alloy with a concentration of up to about seventeen percent (17%) nickel by weight, and preferably between about twelve percent (12%) to about seventeen percent (17%) nickel by weight. A corrosion resistant sealer may be applied to the first thread of the wheel end assembly rotatable component and/or the second thread of the tone ring. The corrosion resistant sealer can be a wet zinc-rich primer. The corrosion resistant sealer may also be applied to the securing structure.

BRIEF DESCRIPTION OF THE DRAWINGS

The following description and drawings set forth certain illustrative aspects and implementations of the subject disclosure. The drawings are indicative of but a few of the various ways in which one or more aspects or implementations may be employed. Further features of the disclosed subject matter will become apparent from reading the following description with reference to the accompanying drawings, in which.

DESCRIPTION

Figure 1:
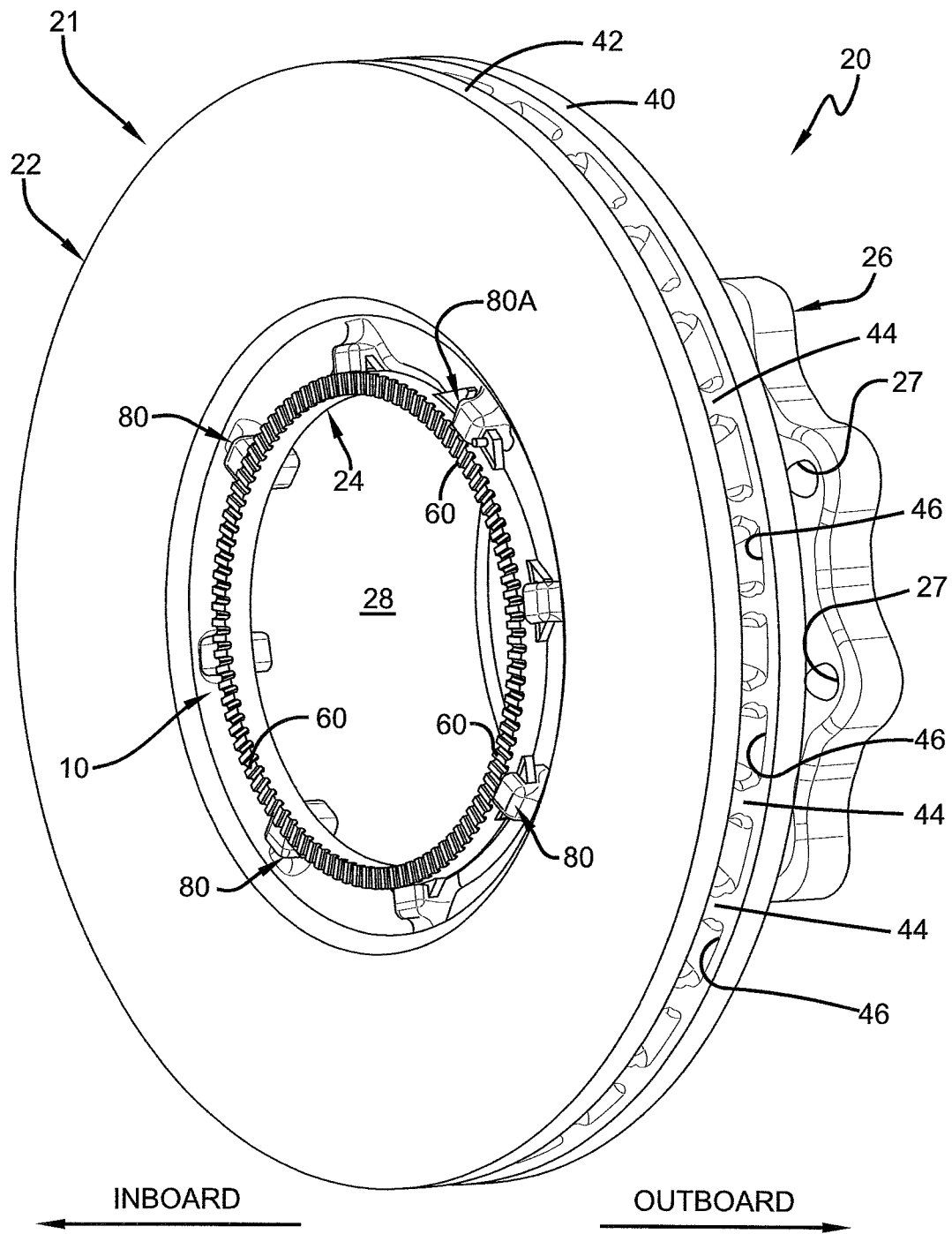
FIG. 1 is a perspective view of a disc brake rotor assembly incorporating a prior art tone ring attachment structure.

The disclosed subject matter is described with reference to the drawings, in which like reference characters are used to refer to like elements throughout the description. For exemplary purposes, details are set forth in order to provide an understanding of the disclosed subject matter. It will be understood, however, that the disclosed subject matter can be practiced and implemented without these specific details.

The disclosed subject matter successfully incorporates an improved antilock braking system tone ring mounting structure for use with a heavy-duty vehicle disc brake rotor or wheel hub. It is to be understood that the disclosed subject matter finds application in all types of brake systems without affecting the concept or implementation of the tone ring mounting structure. The improved tone ring mounting structure is corrosion-resistant and provides a mounting configuration that is a relatively simple and a secure way to mount a tone ring to a disc brake rotor or wheel hub. The components of the improved tone ring mounting structure may be formed of materials that thermally expand similarly to prevent the tone ring from loosening or disengaging from the disc brake rotor or wheel hub during vehicle operation and potentially causing the antilock braking system to become nonfunctional or unreliable. The improved tone ring mounting structure provides an effective, economical and efficient structure which overcomes drawbacks, limitations and disadvantages of the prior art. It will be appreciated that the improved tone ring mounting structure may also be used in drum type braking systems.

Figure 2:
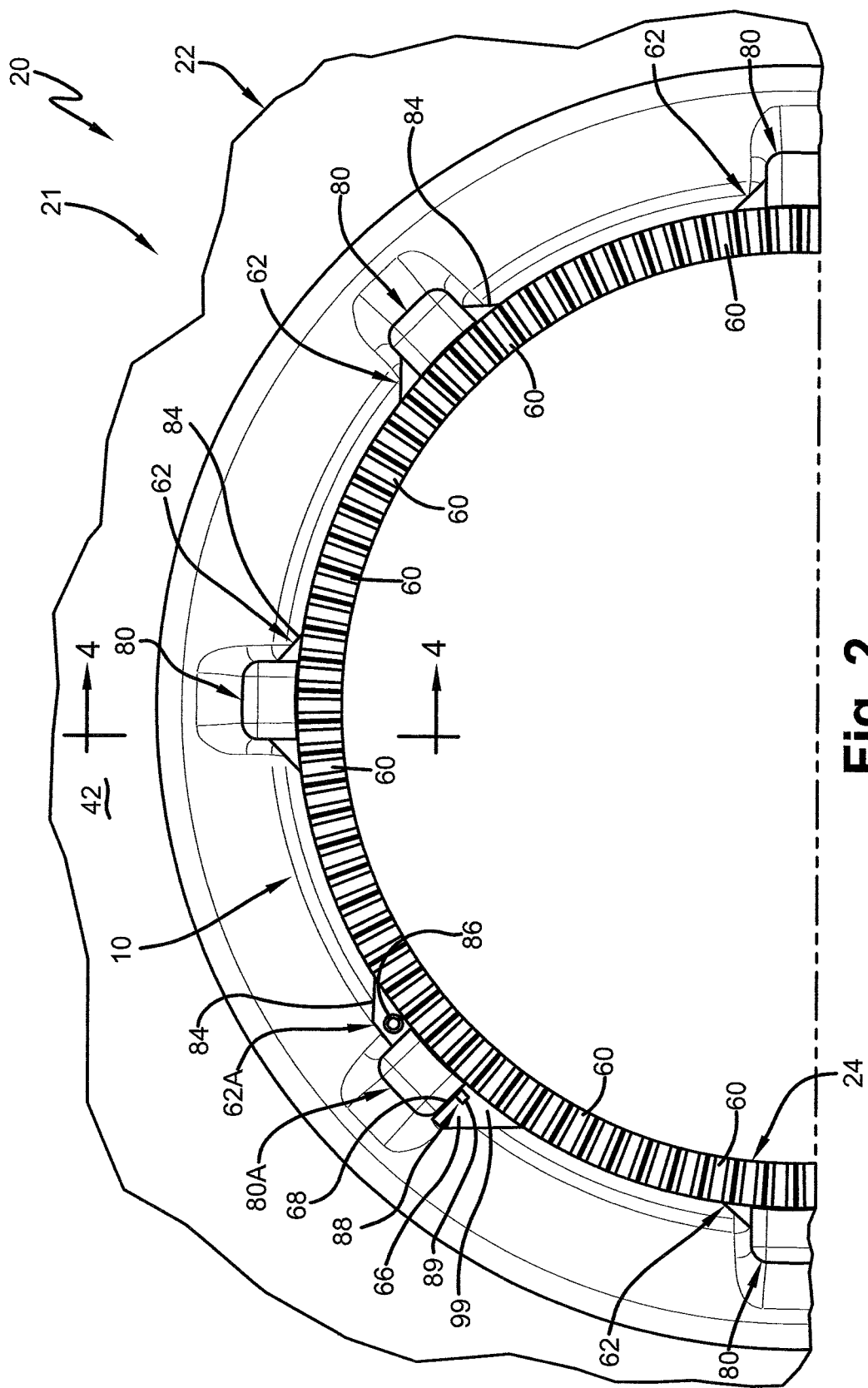
FIG. 2 is an enlarged plan view of a portion of the disc brake rotor assembly illustrated in FIG. 1.

In order to better understand the improved tone ring mounting structure of the disclosed subject matter and the environment in which it operates, a disc brake rotor assembly 20 for a heavy-duty vehicle (not shown) which incorporates a prior art tone ring mounting structure 10 is illustrated in FIGS. 1-2 and will described. The heavy-duty vehicle disc brake rotor assembly 20 operates in a harsh environment under the heavy-duty vehicle, such as a trailer. The harsh environment can impact the effectiveness of a vehicle antilock braking system. Contaminants, such as water, brine, road spray, various road salts, or other de-icing chemicals can splash on the disc brake rotor assembly 20 during operation of the heavy-duty vehicle, and potentially create corrosion cells that may expand and eventually cause rust-jacking. Damage to components of the disc brake rotor assembly 20 from rust-jacking resulting from corrosion cells expanding can potentially lead to a fault of/in the antilock braking system fault. Such fault may require the disc brake rotor assembly 20 to be serviced in order to repair or replace damaged components, resulting in down time of the heavy-duty vehicle.

The disc brake rotor assembly 20 for use with an antilock braking system includes a disc brake rotor 21 and a tone ring 24. The tone ring 24 is mounted to an inboard end of the disc brake rotor 21 utilizing the prior art tone ring mounting structure 10. The disc brake rotor assembly 20 is rotatably mounted on an axle spindle (not shown) of an axle, as is known. The disc brake rotor 21 includes a disc portion 22, a flange portion 26, and a sleeve portion 28. Sleeve portion 28 is located between and connects the disc portion 22 and the flange portion 26. The flange portion 26 is formed with openings 27 that receive mechanical fasteners, such as bolts, to connect the disc brake rotor assembly 20 to a wheel hub (not shown), as is known. The disc portion 22, flange portion 26, and sleeve portion 28 are integrally formed as one-piece by suitable means such as casting.

The disc portion 22 of the disc brake rotor 21 includes an outboard disc 40 and an inboard disc 42, which are axially spaced apart from one another and are interconnected by a plurality of vanes or pins 44. The vanes or pins 44 provide a rigid connection between the inboard disc 42 and the outboard disc 40, while forming radially-extending air passages 46 between the vanes. It should be appreciated that the disc portion 22 could be solid. The outboard disc 40 and inboard disc 42 are operationally located between a pair of brake pads (not shown) as is known.

Figure 3:
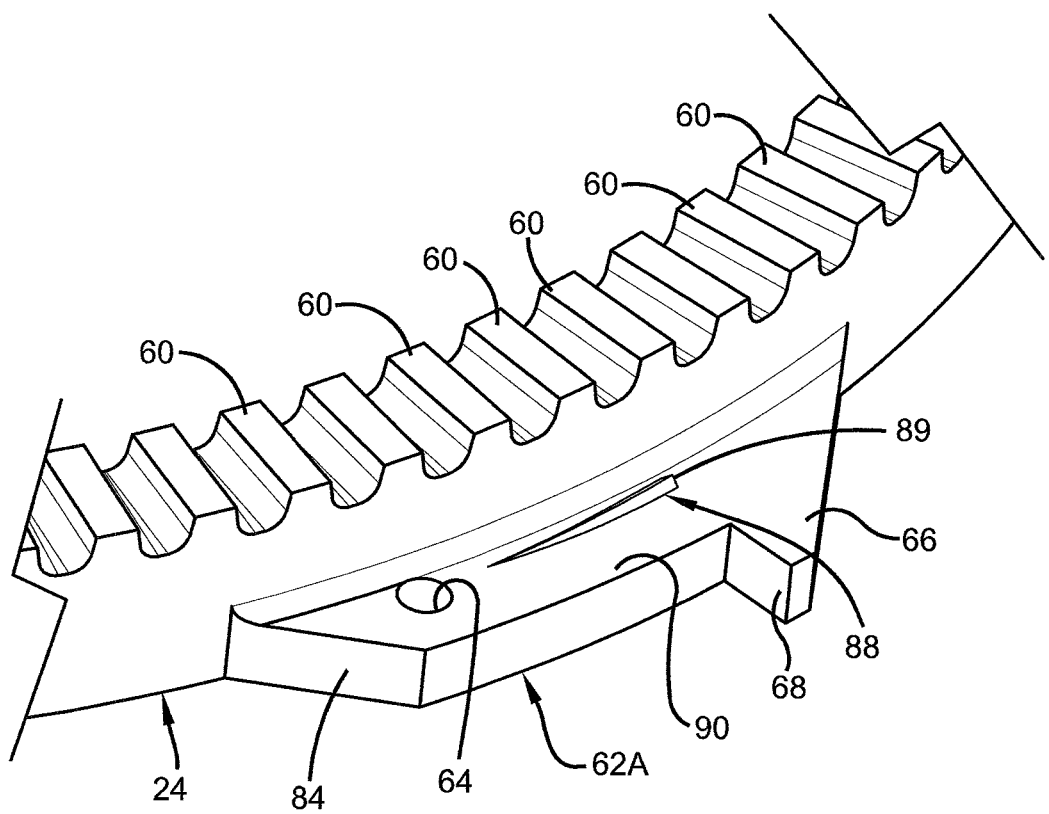
FIG. 3 is a greatly enlarged fragmentary perspective view of a portion of a tone ring of the disc brake rotor assembly of FIG. 1, illustrating a boss, a tab and shim structure of the prior art tone ring attachment structure.

The tone ring 24 is typically formed from an iron-based sintered powdered metal material. Iron-based materials are capable of disrupting magnetic fields that are generated and detected by an associated antilock braking system sensor (not shown). The tone ring 24 is formed with a plurality of circumferentially arrayed teeth 60 (FIG. 2), each of which can disrupt magnetic fields generated by the antilock braking system sensor as it passes the sensor. The teeth 60 of the tone ring 24 are formed in an axial end surface portion of the tone ring. The teeth 60 are evenly spaced apart a known distance. As is known, the antilock braking system sensor detects disruptions to the magnetic fields and produces electrical signals representative of, for example, the time between sensing the presence of adjacent teeth 60. The electrical signals produced by the antilock braking system sensor are communicated to an electronic control unit (not shown) of the antilock braking system. The electronic control unit controls the antilock braking system between actuated and unactuated states under programmed conditions. As is known, the antilock braking system sensor is fixed to a non-rotating component of the heavy-duty vehicle, such as an axle, in close proximity to the tone ring 24. A plurality of bosses 62 (FIGS. 2-3) are formed on the tone ring 24 and extend radially outward from an outer perimeter of the tone ring. In the illustrated example, eight bosses 62 are formed on the tone ring 24. At least one designated boss 62A (FIGS. 2-3) includes an opening 64 (FIG. 3) extending axially and completely through the boss. The bosses 62 are spaced uniformly about the outer circumference of the tone ring 24. Each of the bosses 62 has a radial extent from the body of the tone ring 24 of about 6 mm.

Figure 4:
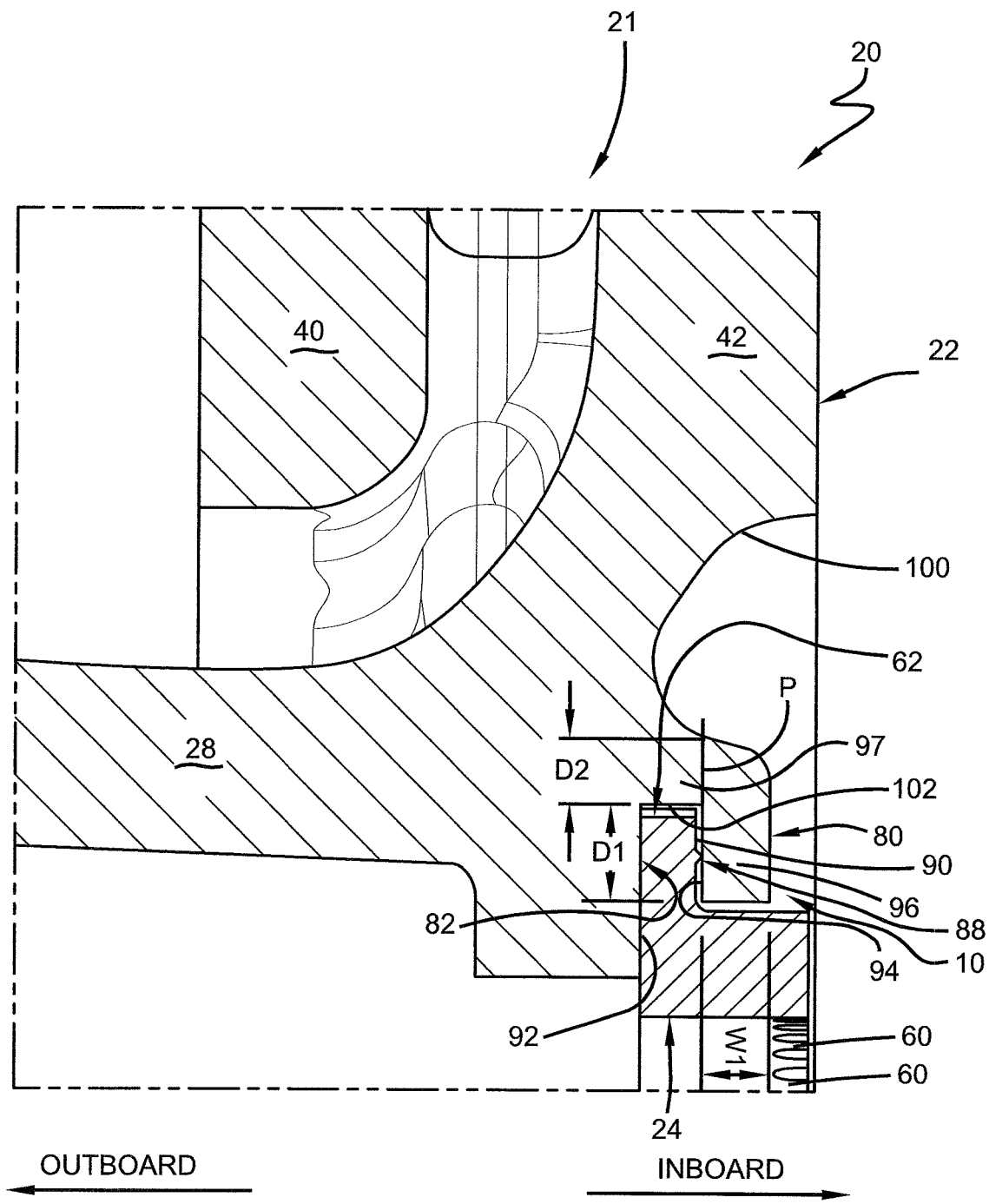
FIG. 4 is an enlarged fragmentary cross-sectional view of a portion of the disc brake rotor assembly incorporating the prior art tone ring attachment structure, taken approximately along the line 4-4 in FIG. 2.
Figure 5:
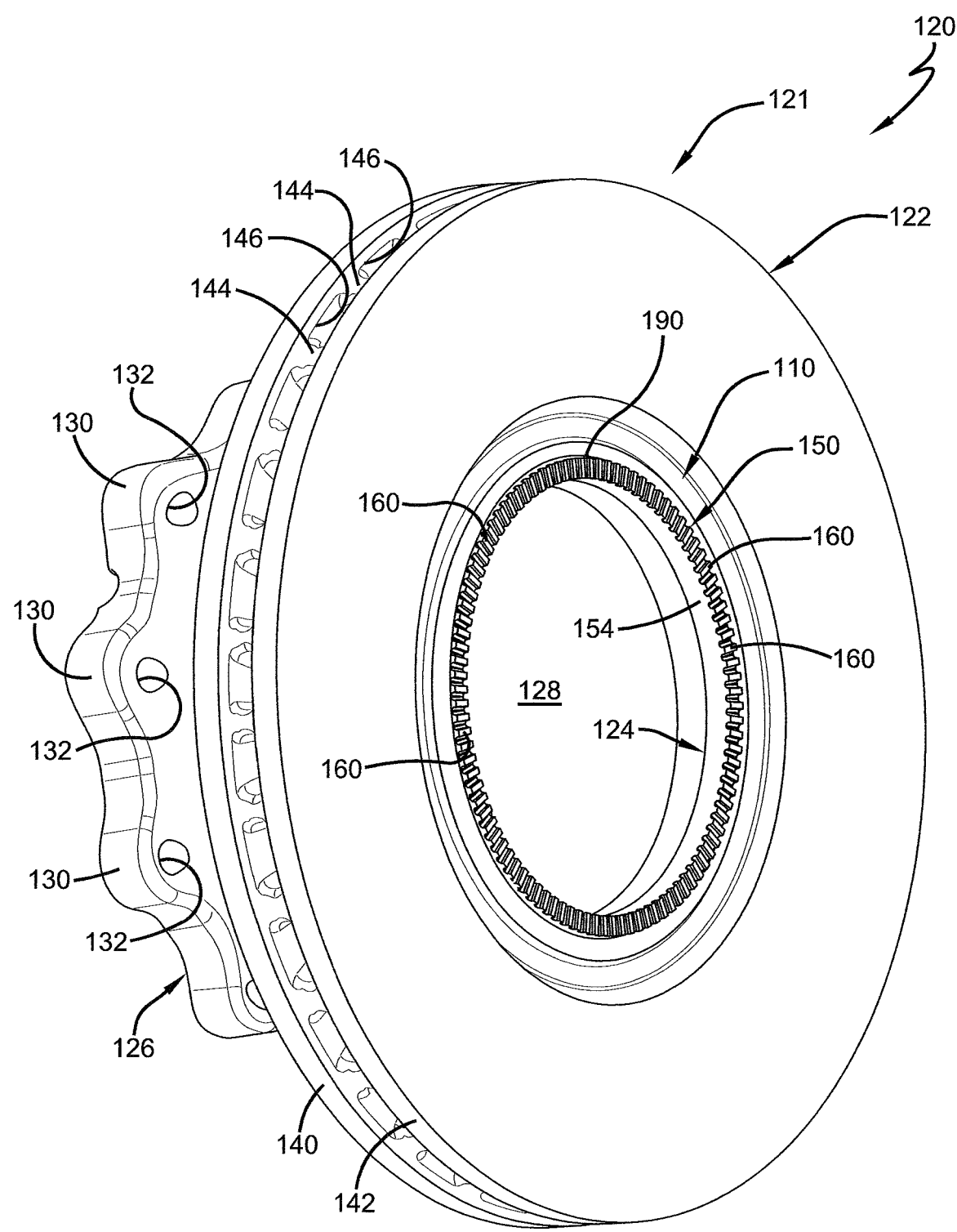
FIG. 5 is a perspective view of a disc brake rotor assembly incorporating a tone ring attachment structure, according to an aspect of the disclosed subject matter, for use with an antilock braking system of a heavy-duty vehicle.
Figure 6:
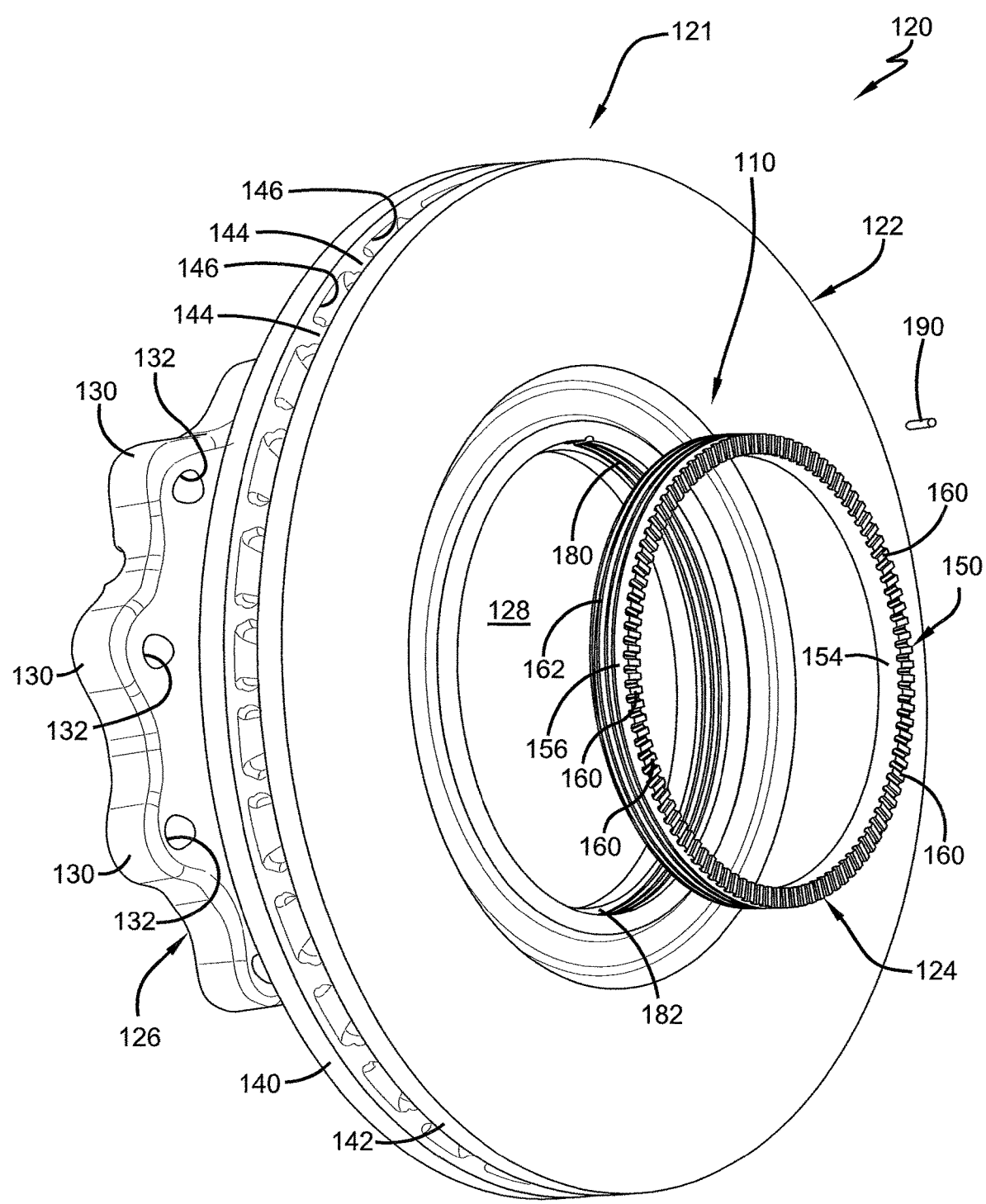
FIG. 6 is an exploded perspective view of the disc brake rotor assembly and tone ring attachment structure illustrated in FIG. 5.
Figure 7:
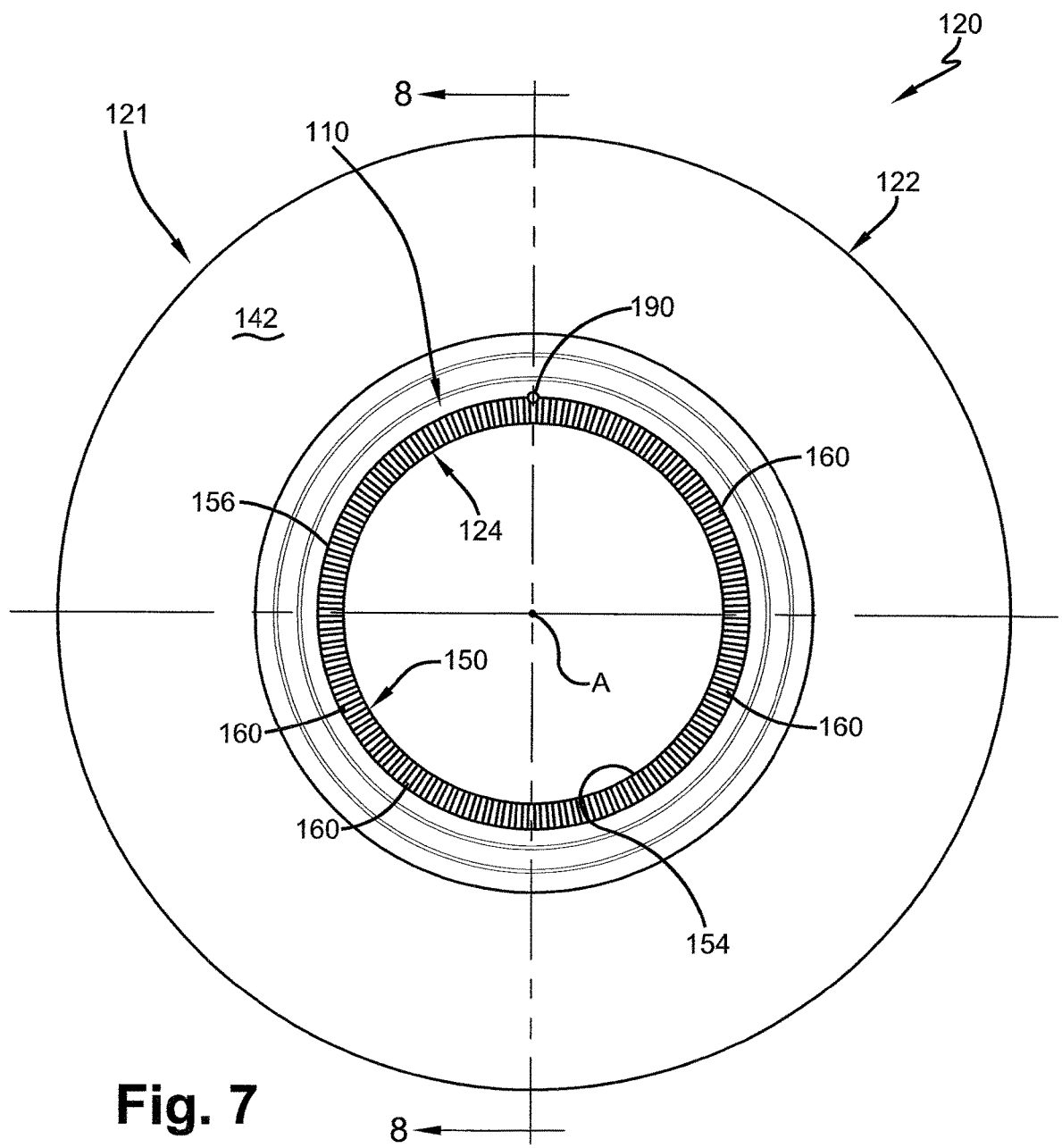
FIG. 7 is an elevational view of the disc brake rotor assembly and tone ring attachment structure illustrated in FIG. 5, viewed looking in an outboard direction.

A plurality of lugs 80 (FIGS. 1-2) are formed on and extend radially inwardly from the disc portion 22. Eight identical lugs 80 are formed on the disc portion 22. The lugs 80 are uniformly spaced apart about the inner circumference of the disc portion 22. Each lug 80 is formed with a circumferentially extending groove 82 (FIG. 4) in its radially inner surface.

The bosses 62 on the tone ring 24 are located and spaced to correspond to the location and spacing of respective lugs 80 of the disc portion 22. Each lug 80 receives and captures a respective boss 62 of the tone ring 24 to secure the tone ring 24 to the disc portion 22. The tone ring 24 is mounted on the disc portion 22 by placing the tone ring adjacent the inboard disc 42 of the disc portion 22. The tone ring 24 is positioned so each boss 62 is located circumferentially between adjacent lugs 80. The tone ring 24 is then rotated until each respective boss 62 is seated in a corresponding groove 82 of a respective lug 80. An angled leading edge 84 (FIG. 3) is provided on each boss 62 to guide and facilitate installation in the groove 82 of the respective lug 80.

To prevent unintentional rotation of the tone ring 24 relative to the disc brake rotor 21 in one direction, the designated boss 62A (FIGS. 2-3) is formed with a radially outward extending shoulder or tab 66. The designated boss 62A is received within a designated lug 80A and cooperates with the designated lug to prevent rotation of the tone ring 24 relative to the disc brake rotor 21 in one or a first direction, clockwise as viewed in FIG. 2. When each respective boss 62 is seated in a corresponding groove 82 of lug 80, a radially extending surface 68 of the shoulder or tab 66 of the designated boss 62A engages an outer surface of the designated lug 80A to stop rotation of the tone ring in the first direction.

To prevent rotation of the tone ring 24 relative to the disc brake rotor 21 in a second or counterclockwise direction, the opening 64 formed in the designated boss 62A is located in a circumferentially opposite end portion of the designated boss from the shoulder or tab 66. A device, such as a roll pin 86, is press-fit within the opening 64 in the designated boss 62A, as illustrated in FIG. 2. The roll pin 86 may engage another surface of the designated lug 80A opposite the surface engaged by the shoulder or tab 66 to block rotation of the tone ring 24 in the opposite second direction. The shoulder or tab 66 of the designated boss 62A, the designated lug 80A, a surface defining the opening 64 in the boss, and the roll pin 86 cooperate to prevent rotation of the tone ring 24 relative to the disc portion 22. Thus, detachment of bosses 62, 62A from grooves 82 of lugs 80, 80A and unintentional rotation of the tone ring 24 relative to the disc portion 22 that may cause the tone ring to unseat from the disc brake rotor 21 is inhibited.

Each boss 62, 62A further includes a spacer or shim 88 (FIG. 3) formed on an inboard facing surface 90 of the boss. The shim 88 has a triangular cross-section taken in the circumferential direction. The cross-section of the shim 88 increases in height as it progresses counterclockwise, as viewed in FIG. 3, to an end portion 89. The height of the end portion 89 is about 0.5 mm. As each boss 62, 62A is seated in a respective lug 80, 80A, the shim 88 rides along and forces against an inboard surface or wall 94 (FIG. 4) of the groove 82 to partially fill in any space between the boss and inboard walls of the lugs. The shim 88 forces the tone ring 24 against an outboard surface or wall 92 of the groove 82. Thus, relative axial movement between the tone ring 24 and the disc portion 22 is inhibited. The end portion 89 of the shim 88 may be located outside of the circumferential extent of the designated lug 80A.

Each groove 82 in a respective lug 80 has a boss retaining portion 96 (FIG. 4) located directly axially inboard of the groove. The boss retaining portion 96 of the lug 80, 80A resists radial outward movement of the tone ring 24. The boss retaining portion 96 is defined by structure of the lug 80 of the disc portion 22 that has an axial extent or width W1. The boss retaining portion 96 is also defined by structure of the lug 80 that has a radial extent or depth D1 to a radial end surface 102. The disc portion 22 also has a root portion 97 located radially outward of the groove 82 and axially inboard relative to the outboard surface 92 of the lug 80. The root portion 97 has a radial extent or depth D2 from the radial end surface 102 to a point where a line or plane P extending from the inboard surface 94 of the groove intersects a relief 100 cast into the inboard disc 42. The boss retaining portion 96 and the root portion 97 of each lug 80, 80A cooperate to resist rust-jacking due to growth of corrosion cells within the groove 82. The boss retaining portion 96 is a cantilevered region that may be subject to damage due to net volume expansion associated with rust-jacking. Thus, it would be desirable to minimize or eliminate the possibility of damage to the cantilevered boss retaining portion 96 due to corrosion cells and rust-jacking.

The prior art disc brake rotor assembly 20, while mostly satisfactory for its intended purpose, includes certain limitations, drawbacks and disadvantages. Since the disc brake rotor assembly 20 operates in a harsh environment under the heavy-duty vehicle, contaminants, such as water, brine, road spray or various road salts or de-icing agents, can splash onto the disc brake rotor assembly 20 during operation of the heavy-duty vehicle and potentially create corrosion cells in spaces between the disc portion 22 and the tone ring 24. For example, the disc brake rotor assembly 20 may be prone to the formation of corrosion cells in gaps or void spaces, such as grooves 82, between the tone ring 24 and the disc portion 22 and at adjacent areas. The corrosion cells may then propagate or spread to other gaps, and/or to other adjacent areas. Rust may build up at the corrosion cells and create a rust-jacking condition. Once the rust buildup becomes significant, accumulation of the rust within the groove 82 may push and loosen parts of the tone ring 24 away from the parts of the disc portion 22. If the cantilevered boss retaining portion 96 and the root portion 97 of each lug 80, 80A are not sufficiently strong to resist the force of accumulating rust in the groove 82, the boss retaining portion and root portion could crack or fracture and loosen the tone ring 24.

Loosened or broken parts of the tone ring 24 and/or parts of the disc portion 22 may result in the antilock braking system becoming unreliable and/or damage components of the antilock braking system, such as portions of the sensor, tone ring and/or the disc brake rotor. Furthermore, the prior art tone ring mounting structures that have the boss retaining portion 96 with a cantilevered portion may be subject to damage due to net volume expansion associated with rust-jacking. In addition, the device press-fit within opening 64 in the designated boss 62A that assures unintentional rotation of the tone ring 24 relative to the disc portion 22 of the disc brake rotor 21, such as roll pin 86, is typically made of a ferrous metal. The ferrous metal device can corrode when exposed to contaminants, such as water, brine, road spray or various road salts or de-icing agents, which can splash onto the disc brake rotor assembly 20 during operation of the heavy-duty vehicle. Once corroded, the device becomes challenging to remove from the opening 64 in the designated boss 62A, making it difficult to detach the tone ring 24 from the disc brake rotor 21 for servicing. Also, because tone ring 24 is typically formed of sintered powdered metal material and the disc brake rotor 21 is typically cast from iron materials, such as gray iron, alloyed modified gray iron or compacted graphite iron, the different materials can potentially thermally expand at different rates during vehicle braking. The difference in thermal expansion of the tone ring 24 and the disc brake rotor 21 can also potentially result in the tone ring 24 becoming loosened from the disc portion 22, which in turn may result in the antilock braking system becoming nonfunctional or unreliable and/or allow the entry of contaminants that can cause corrosion and damage to components of the prior art tone ring mounting structure 10.

Accordingly, a new and improved tone ring mounting structure used in heavy-duty vehicles is provided according to at least one aspect of the disclosed subject matter. The new and improved tone ring mounting structure overcomes the drawbacks, limitations and disadvantages of the prior art tone ring mounting structures 10, and will now be described.

According to one aspect, the improved tone ring mounting structure for an antilock braking system (ABS) is intended for use on heavy-duty vehicles. The tone ring mounting structure includes a wheel end assembly rotatable component having at least one radially extending first end surface and a first thread extending from the wheel end assembly rotatable component. A tone ring is formed with a radially extending second end surface and a second thread extending from the tone ring. The second thread is for threaded engagement with the first thread. Threaded engagement of the first thread of the wheel end assembly rotatable component and the second thread of the tone ring affects movement of the second end surface in a direction toward the first end surface. As used herein, "wheel end" and/or "wheel end assembly" is intended to include at least a wheel hub and brake components, such as a rotatable disc brake rotor or rotatable drum brake hub.

The tone ring is formed from readily available tubular metal material, such as tubular steel. The threaded engagement of the first thread of the wheel end assembly rotatable component and the second thread of the tone ring forces the second end surface against the first end surface. Contact of the second end surface against the first end surface inhibits relative axial movement and relative rotational movement in a first direction between the tone ring and the wheel end assembly rotatable component.

By way of example according to an aspect of the disclosed subject matter, a disc brake rotor assembly 120 (FIGS. 5-9 and 11) incorporates a new and improved tone ring mounting structure 110. The disc brake rotor assembly 120 is intended for use on heavy-duty vehicles, such as trucks and/or trailers. The disc brake rotor assembly 120 includes a disc brake rotor 121, which is a wheel end assembly rotatable component that is mounted for rotation on an axle spindle (not shown), as is known. The disc brake rotor assembly 120 also includes an antilock braking system tone ring 124 constructed for mounting the tone ring to the disc brake rotor 121.

Figure 10:
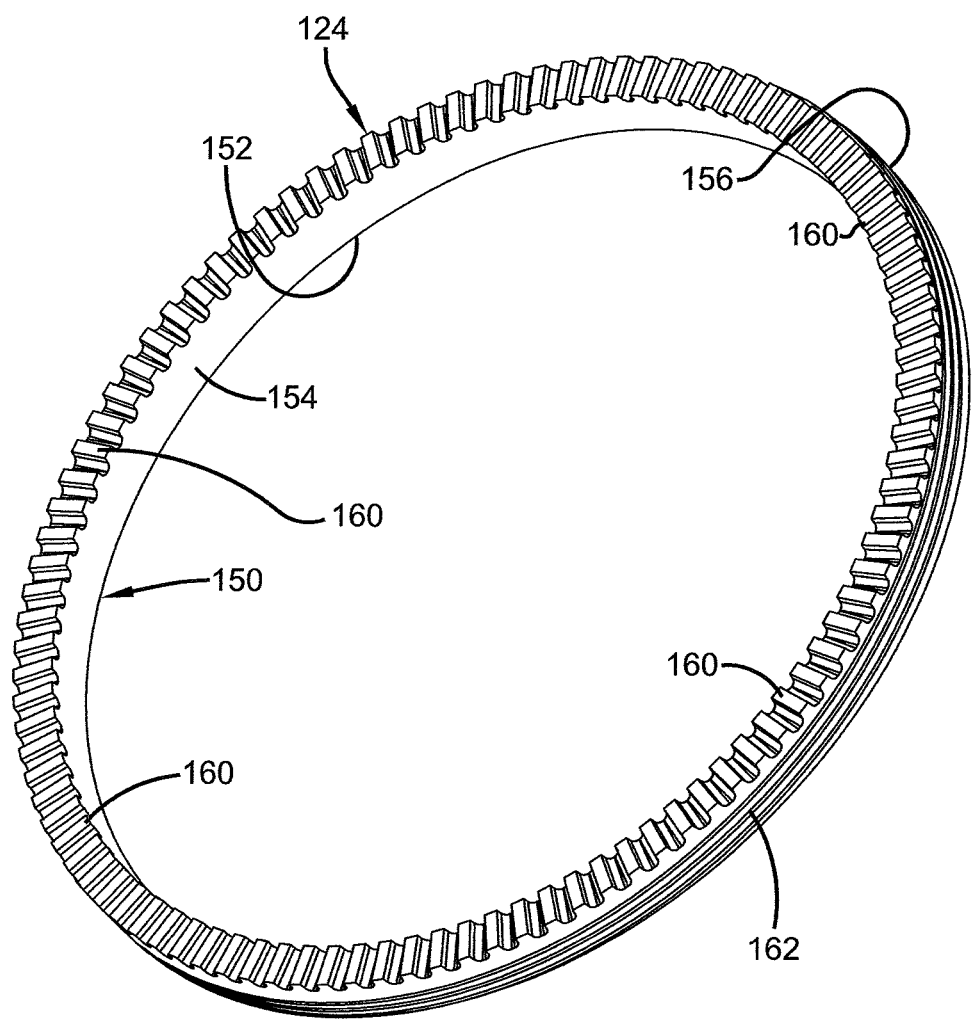
FIG. 10 is an enlarged perspective view of the tone ring of the disc brake rotor assembly of FIG. 5, illustrating a thread of the tone ring attachment structure formed on an external surface of the tone ring.

The tone ring 124 (FIG. 10) is fixedly mounted to the disc brake rotor 121. The tone ring 124 is mounted to an inboard end of the disc brake rotor 121. Use of tone ring mounting structure 110, according to the subject disclosure, reduces corrosion issues and enables the tone ring 124 to more easily be replaced on the disc brake rotor 121, if needed.

The disc brake rotor 121 includes a disc portion 122, a flange portion 126, and a sleeve portion 128 (FIGS. 5-6, 8 and 9). The sleeve portion 128 is located between and connects the disc portion 122 and the flange portion 126 of the disc brake rotor 121. The disc portion 122, the flange portion 126, and the sleeve portion 128 may be integrally formed as one-piece. The disc brake rotor 121 may be cast from a suitable material, such as gray iron, alloyed modified gray iron or compacted graphite iron. The disc brake rotor 121 may be subjected to peak temperatures in excess of about 1100° F. and may regularly be subjected to temperatures of about 800° F. The material used to cast the disc brake rotor 121 must be able to withstand these temperatures as well as physical forces typically encountered during braking of the heavy-duty vehicle. The disc brake rotor 121 of disc brake rotor assembly 120 is formed with features to accept a separate or discrete tone ring, such as tone ring 124.

The flange portion 126 of the disc brake rotor 121 may be formed with a plurality of radially extending bosses 130 and respective openings 132 formed in the bosses. The openings 132 receive mechanical fasteners, such as bolts or wheel studs (not shown), to removably secure the disc brake rotor assembly 120 to a wheel hub (not shown) of a wheel end assembly, as is known. The flange portion 126 may alternatively be formed as a continuous circular member containing the openings 132.

The disc portion 122 of the disc brake rotor 121 includes an outboard disc 140 and an inboard disc 142, which are spaced apart from one another along a longitudinal central axis A (FIGS. 7-9) and are interconnected by a plurality of vanes or pins 144. The vanes or pins 144 are structural members that extend between the outboard disc 140 and the inboard disc 142 and are integrally cast with the outboard disc and the inboard disc. The vanes or pins 144 provide a rigid connection between the outboard disc 140 and the inboard disc 142, while creating radially-extending air passages 146 for cooling the disc portion 122, and thus the disc brake rotor 121. The outboard disc 140 and the inboard disc 142 are each operationally located between a pair of brake pads (not shown) for braking upon engagement with the inboard and outboard discs, as is known. It is to be understood that the disc portion 122 of the disc brake rotor 121 may alternatively have a solid construction without affecting the overall concept or operation of the disclosed subject matter.

The tone ring 124 includes a substantially annular body 150 (FIG. 10) formed of a ferrous metal material, such as steel. Ferrous materials are preferred because they are capable of disrupting magnetic fields that are generated and detected by an associated antilock braking system sensor (not shown). It will be apparent, however, that the tone ring 124 may be made from any suitable material that has the capability of disrupting magnetic fields. It is to be understood that the tone ring 124 may be formed of a different material than the disc brake rotor 121.

The body 150 of the tone ring 124 extends for a relatively short axial distance in a direction parallel to the longitudinal central axis A. The body 150 is preferably cut from a tubular member of readily available stock tubular steel. Using readily available stock tubular steel to form the body 150 provides significant economical and manufacturing advantages. Using steel for the tone ring 124 has further advantages. Steel is more robust than powdered metal for tone ring applications and it avoids variable density that is often present in powdered metal and that can degrade corrosion resistance, impact strength and abrasion resistance.

The body 150 includes an outboard facing planar annular end surface 152 (FIGS. 8-11). The body 150 also has an inner cylindrical surface 154. The body 150 further has an external cylindrical surface 156.

The tone ring 124 is formed with a plurality of circumferentially arrayed and axially extending teeth 160 (FIGS. 5-11), each of which can disrupt magnetic fields generated and detected by an antilock braking system sensor (not shown). The teeth 160 are spaced apart a known distance. The teeth 160 of the tone ring 124 are formed in an inboard facing surface of the tone ring. It is to be understood that the teeth 160 of the tone ring 124 may be made from any suitable material that is capable of disrupting magnetic fields generated and detected by the antilock braking system sensor without affecting the overall concept or operation of the disclosed subject matter. It is also contemplated that the teeth 160 of the tone ring 124 may be circumferentially arrayed and radially extending or even at an acute angle relative to the axis A.

As is known, the antilock braking system sensor detects disruptions to the magnetic field and produces electrical signals representative of, for example, the time between sensing the presence of adjacent teeth 160. The electrical signals produced by the antilock braking system sensor are communicated to an electronic control unit (not shown) of the ABS. The electronic control unit controls the antilock braking system between actuated and unactuated states under programmed conditions. As is known, the antilock braking system sensor would be fixed to a component of the heavy-duty vehicle, such as an axle, in close proximity to the tone ring 124.

The improved tone ring mounting structure 110 for attaching the tone ring 124 to the disc portion 122 of the disc brake rotor 121 includes a screw thread or external screw thread 162 (FIGS. 6 and 8-11) formed in the external cylindrical surface 156 of the body 150. The external screw thread 162 may be formed with any suitable shape, tooth pitch, tooth depth and number of thread start positions, or other characteristics, without affecting the overall concept or operation of the disclosed subject matter. The external screw thread 162 may be formed to any axial extent along the external cylindrical surface 156 of the body 150 of the tone ring 124. By way of example, the external screw thread 162 is illustrated as extending over the entire axial extent of the external cylindrical surface 156.

The improved tone ring mounting structure 110 for attaching the tone ring 124 to the disc portion 122 of disc brake rotor 121 also includes an internal thread 180 (FIGS. 6, 9 and 11) formed on and extending radially inwardly from the disc portion. The disc portion 122 of disc brake rotor 121 also has a radially extending annular end surface 182 (FIGS. 6, 8-9, and 11) that essentially forms an inboard facing surface or end surface in the disc portion adjacent to the internal thread 180. The internal thread 180 in the disc portion 122 matches and cooperates with the external screw thread 162 of the tone ring 124. The internal thread 180 of the disc portion 122 receives and threadably engages the external screw thread 162 of the tone ring 124. It should be apparent that the screw thread 162 of the tone ring 124 may be formed in the inner cylindrical surface 154. The thread 180 of the disc portion 122 of the disc brake rotor 121 would then be formed in an external surface of the disc brake rotor.

A tool (not shown) may be provided that spans diametrically opposite notches formed between the teeth 160 of the tone ring 124 to affect rotation of the tone ring relative to the disc portion 122 of the disc brake rotor 121 to aid in installation. It should be appreciated that the tone ring 124 may have provisions for accepting other tools, including special tools, in order to rotate the tone ring for threaded engagement with the disc portion 122 of the disc brake rotor 121 in a manufacturing operation.

During assembly of the disc brake rotor assembly 120, the external screw thread 162 of the tone ring 124 is threaded into the internal thread 180 of the disc portion 122 of the disc brake rotor 121. As the external screw thread 162 on the tone ring 124 is threaded into the internal thread 180 in the disc portion 122, the annular end surface 152 of the tone ring moves in a direction toward the annular end surface 182 of the disc portion.

Figure 8:
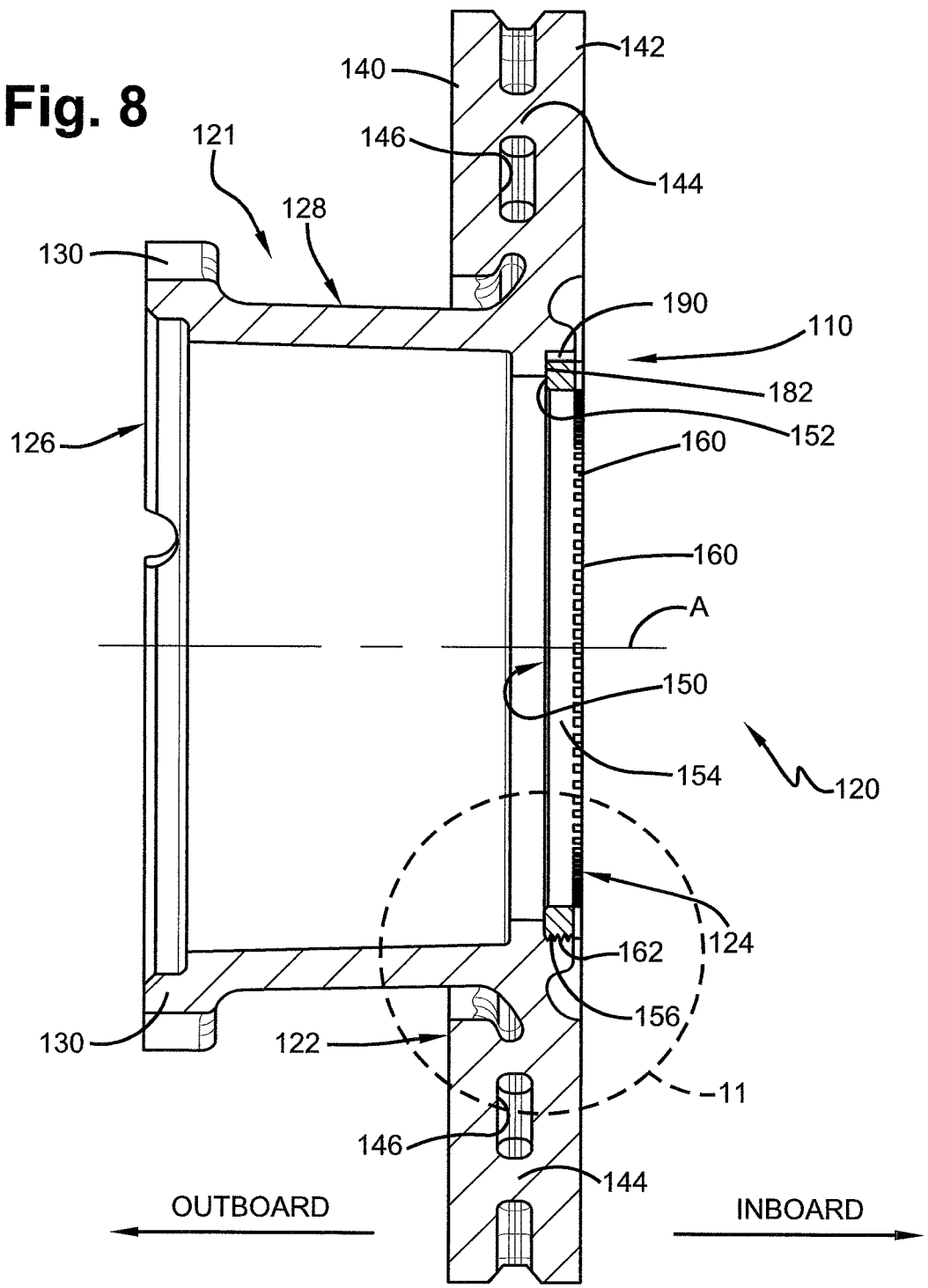
FIG. 8 is a cross-sectional view of the disc brake rotor assembly and tone ring attachment structure, taken approximately along the line 8-8 in FIG. 7.
Figure 9:
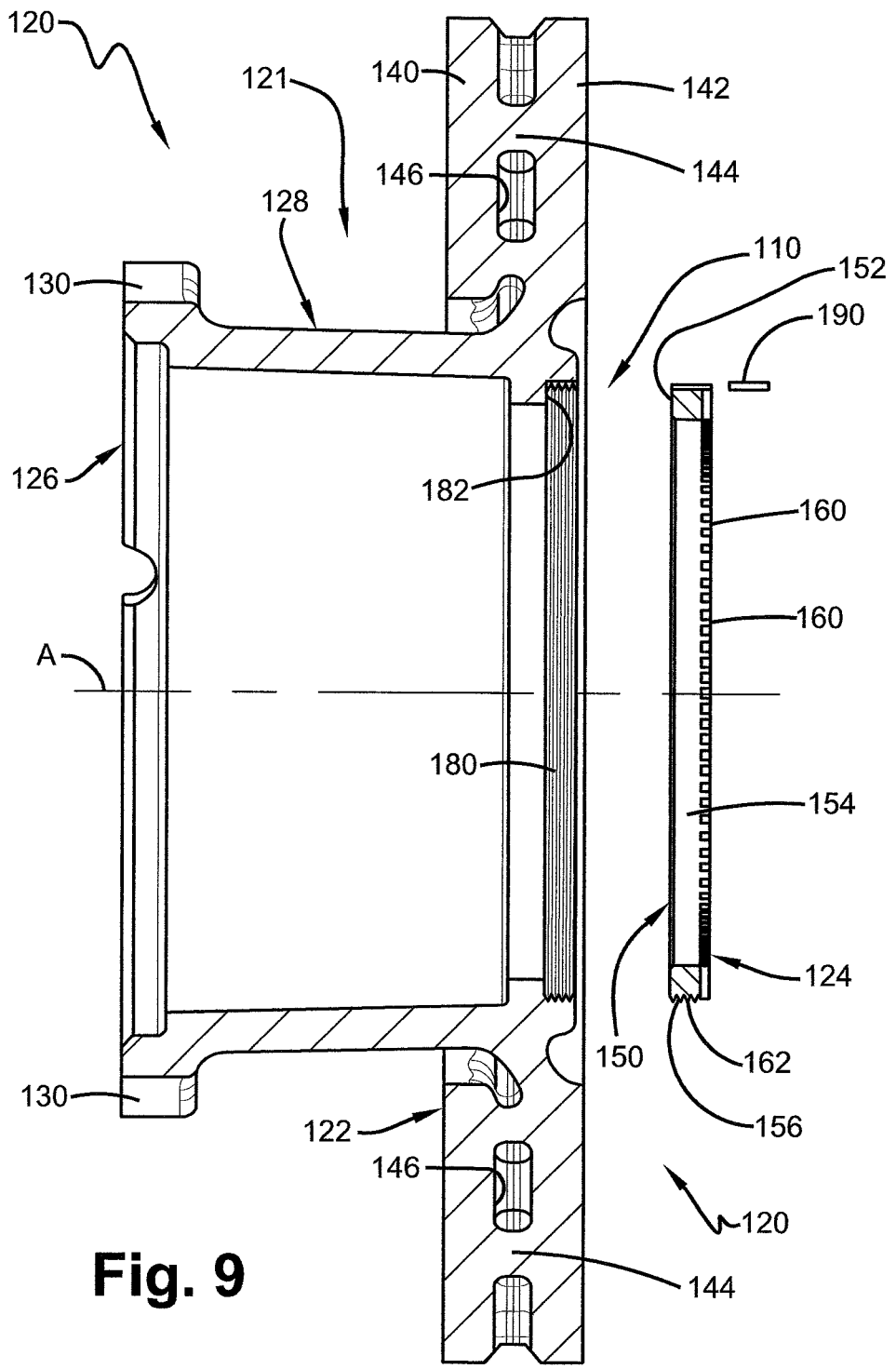
FIG. 9 is an exploded cross-sectional view, similar to FIG. 8, of the disc brake rotor assembly and tone ring attachment structure.
Figure 11:
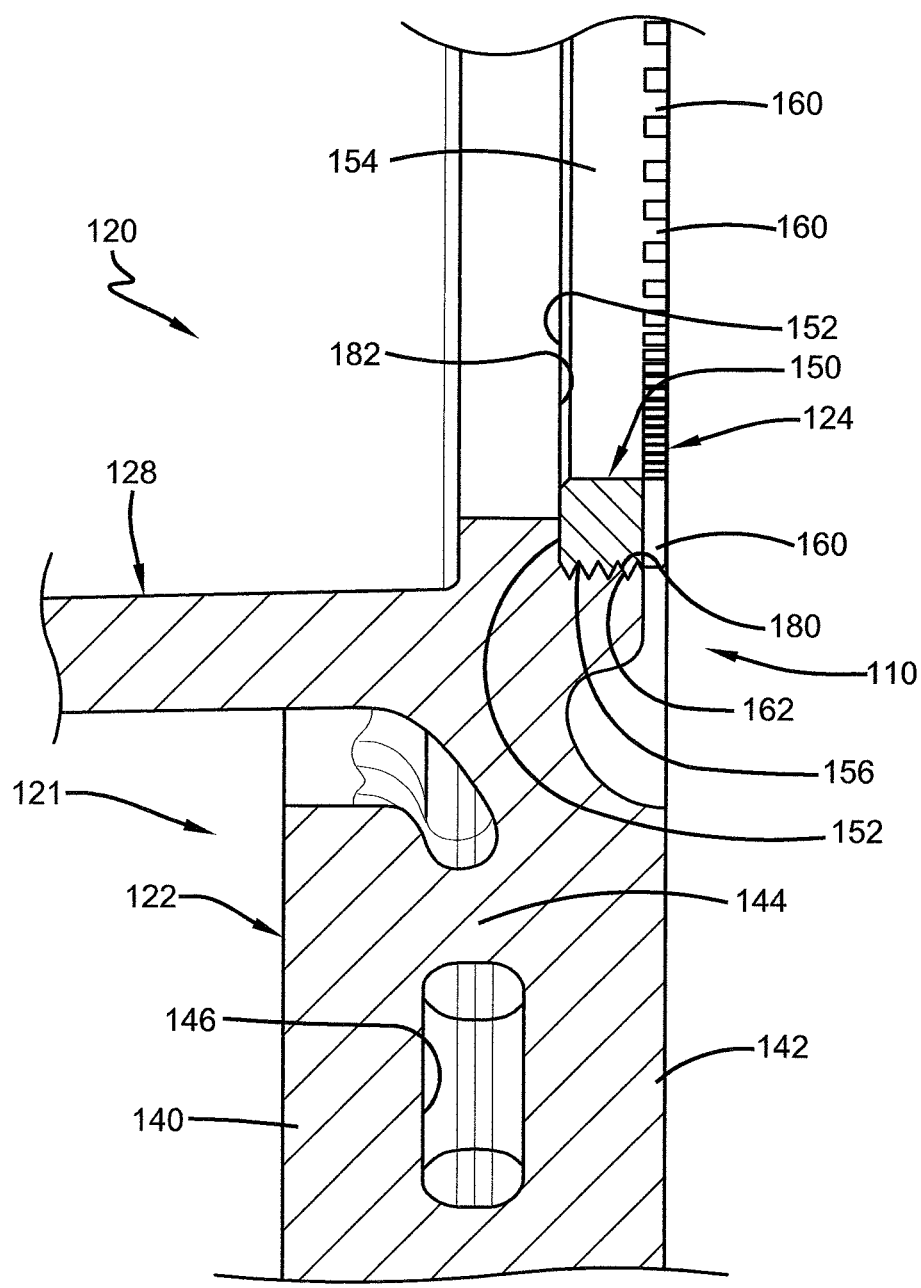
FIG. 11 is an enlarged fragmentary cross-sectional view of a portion of the disc brake rotor assembly and tone ring mounting structure illustrated in FIG. 8 taken from the area 11 in FIG. 8, showing the tone ring threaded into the disc brake rotor.
Figure 12:
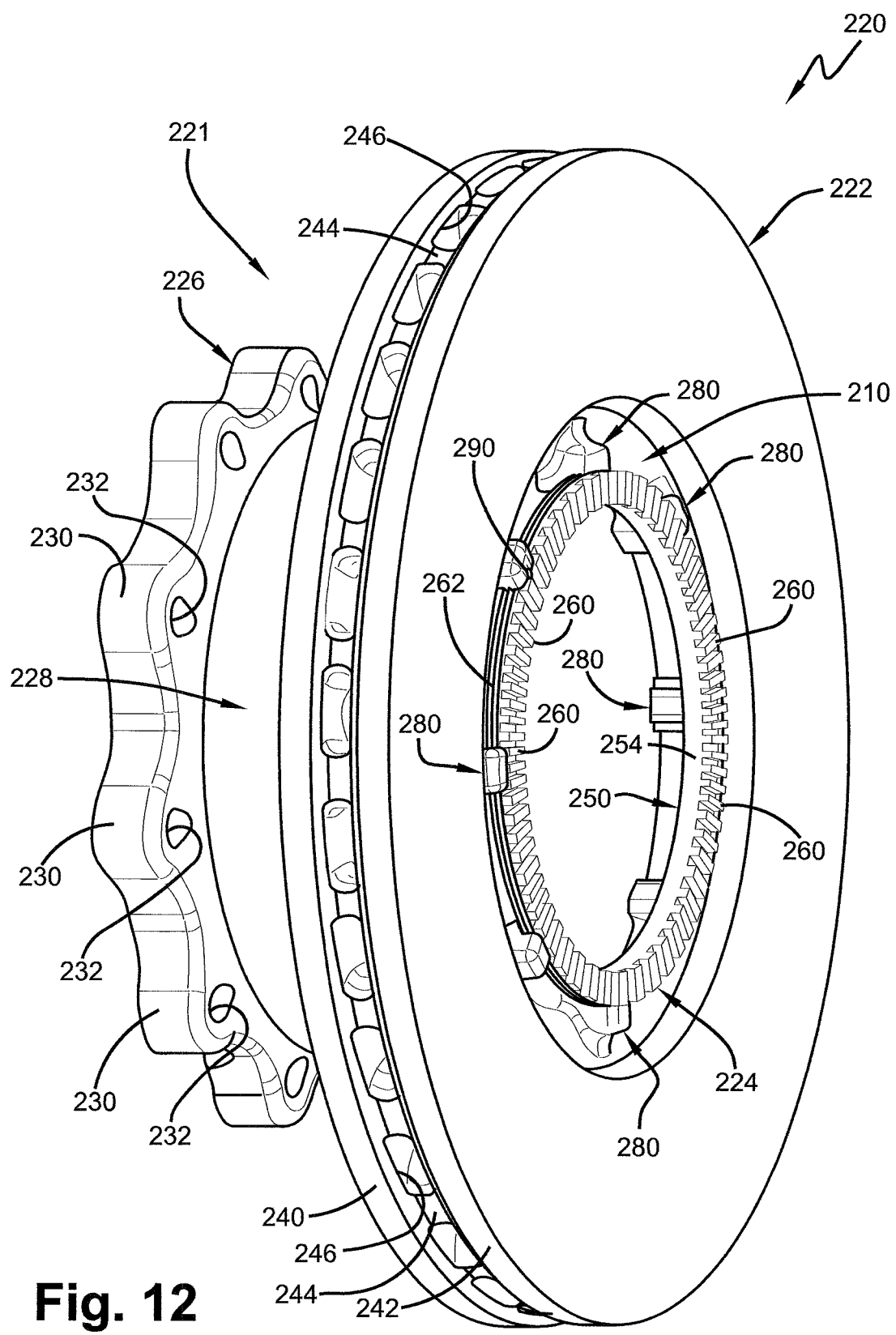
FIG. 12 is a perspective view of a disc brake rotor assembly incorporating a tone ring mounting structure, according to another aspect, for use with an antilock braking system.

Upon sufficient relative rotation between the tone ring 124 and the disc portion 122 of the disc brake rotor 121, the annular end surface 152 of the tone ring engages the annular end surface 182 of the disc brake rotor (FIGS. 8 and 11). The tone ring 124 can be tightened against the disc portion 122 so the annular end surface 152 and the annular end surface 182 are forced against one another by the wedging action of the threads so that virtually no space or gap exists between the tone ring and the disc brake rotor. Thus, there is little or no space for contaminants, such as water or chemical road treatments, to enter and cause corrosion cells that can evolve into rust-jacking and cause damage to the tone ring 124 and/or the disc brake rotor 121. The tightening of the tone ring 124 into the disc portion 122 of the disc brake rotor 121 to cause engagement at the annular end surfaces 152, 182 prevents further relative rotation in the direction of tightening, such as clockwise if a right-handed thread is employed. The external screw thread 162 and the internal thread 180 have an axial extent that is substantially perpendicular to the respective annular end surfaces 152, 182.

To prevent unintentional relative rotation of the tone ring 124 in a direction of loosening relative to the disc portion 122 of the disc brake rotor 121, such as counterclockwise if a right handed thread is employed, the improved tone ring mounting structure 110 provides securing structure to prevent such relative rotation. A metal cross pin 190 is utilized to prevent rotation of the tone ring 124 relative to the disc brake rotor 121 once the tone ring is threadably secured to the disc portion 122. The cross pin 190 may fit tightly into at least partial corresponding openings formed in the disc portion 122 and the tone ring 124 (FIGS. 5-9). For example, the cross pin 190 could be inserted into a drilled opening at the threaded interface between the external screw thread 162 of the tone ring 124 and the internal thread 180 of the disc portion 122. The cross pin 190 essentially deforms a portion of both the external screw thread 162 and the internal thread 180 and forms a positive barrier to prevent rotation of the tone ring 124 relative to the disc portion 122. It is contemplated that other suitable mechanisms may be employed to prevent unintentional relative rotation in one or more directions. It is also contemplated that the cross pin 190 may be inserted in other locations and directions that connect the disc portion 122 of the disc brake rotor 121 and the tone ring 124 to prevent relative rotation, for example, a roll pin or set screw extending radially through appropriate respective portions of the disc portion and the tone ring. It is further contemplated that a relatively thin and readily deformable piece of steel extending from the tone ring 124 can be forced into a groove (not shown) or over a detent (not shown) in the disc portion 122 to prevent rotation of the tone ring relative to the disc portion. It is to be understood that threaded engagement of the tone ring 124 with the disc portion 122 of the disc brake rotor 121 at least inhibits rotation of the tone ring relative to the disc brake rotor once the tone ring is secured to the disc portion, with or without the cross pin 190 or other securing structure.

It should be noted that the disc brake rotor assembly 120 preferably has no portion of the improved tone ring mounting structure 110 located axially inboard of the tone ring 124. The improved tone ring mounting structure 110 supports and retains the tone ring 124 without cantilevered structure as in the prior art and that could be damaged by rust-jacking. Thus, a significant advantage and service life can be achieved with the improved tone ring mounting structure 110 of the subject disclosure. Manufacturing of the tone ring 124 is also simpler.

The disc brake rotor assembly 120 may operate in a harsh environment under the vehicle. Contaminants, such as water, brine, road spray or various road salts, or other de-icing agents, can splash onto the disc brake rotor assembly 120 during operation of the heavy-duty vehicle. In order to further minimize the formation of corrosion cells and rust-jacking, the disc brake rotor 121, the tone ring 124, and/or other components associated with improved tone ring mounting structure 110, may be provided with a corrosion resistant coating or treatment. The coating or treatment may be a zinc-rich coating applied to all surfaces of the disc brake rotor 121, the tone ring 124, and/or other components associated with improved tone ring mounting structure 110, or selected surfaces or portions of those components. The zinc-rich coating may be a primer that is an organic epoxy, acrylic or urethane primer, an inorganic primer, or a polyester-based coating. The zinc-rich coating may be in a powder form or a liquid/suspension form before being applied to the disc brake rotor 121, the tone ring 124, and/or other components associated with improved tone ring mounting structure 110.

The zinc-rich coating applied in a powder form may include a zinc content that is in a range of from about ten percent (10%) zinc to about ninety-nine percent (99%) zinc by weight in a dried film. The zinc-rich coating may include a zinc content that is in a range of from about seventy percent (70%) zinc to about ninety percent (90%) zinc by weight in a dried film.

The zinc-rich coating in a powder form may include a percentage of solids that is in a range of from about sixty percent (60%) to about one-hundred percent (100%) by weight. An exemplary zinc-rich coating in a powder form may be an epoxy powder coating sold by PPG Industries under the brand name Evirocron® XZR Powder Coat. The epoxy powder coating may have a composition of about sixty percent (60%) to about one about hundred percent (100%) zinc powder by weight, about five percent (5%) to about ten percent (10%) percent bisphenol-A-(epichlorhydrin) by weight, about five percent (5%) to about ten percent (10%) phenol by weight, about one percent (1%) to about five percent (5%) zinc oxide by weight, about one percent (1%) to about five percent (5%) epoxy resin by weight, and from about 1/10th percent (0.1%) to about one percent (1%) bisphenol A by weight.

The zinc-rich coating may be applied to the disc brake rotor 121, the tone ring 124, and/or other components associated with improved tone ring mounting structure 110 in one coat, although multiple coats may be employed, depending on specific requirements. Preferably, when the zinc-rich coating is applied to the the disc brake rotor 121, the tone ring 124, and/or other components associated with improved tone ring mounting structure 110 as a powder coat, the coating has a thickness that is about at least one thousandth of an inch (0.001") dry film thickness. The zinc-rich coating may be applied to the disc brake rotor 121, the tone ring 124, and/or other components associated with improved tone ring mounting structure 110 with a minimum thickness of from about one and a half thousandths of an inch (0.0015") wet film thickness.

The zinc-rich coating may also be applied in a liquid/suspension form to the disc brake rotor 121, the tone ring 124, and/or other components associated with improved tone ring mounting structure 110. The zinc-rich coating may include a zinc content that is in a range of from about ten percent (10%) zinc to about ninety-nine percent (99%) zinc by weight in a dried film. The zinc-rich coating in a liquid/suspension form may include a zinc content that is in a range of from about seventy percent (70%) zinc to about ninety-six percent (96%) zinc by weight in a dried film. The zinc-rich coating may include a zinc content that is in a range of from about eighty-five percent (85%) zinc to about eighty-nine percent (89%) zinc by weight in a dried film.

The zinc-rich coating in a liquid/suspension form before being applied to the tone ring 124 may include a percentage of solids that is in a range of from about fifty percent (50%) to about ninety percent (90%) by weight, or from about ten percent (10%) to about fifty percent (50%) by volume. The zinc-rich coating may include a percentage of solids of about seventy percent (70%) by weight, or about thirty percent (30%) by volume. In addition, the zinc-rich coating may include a maximum particle size of zinc of about 100 microns in the coating suspension.

An exemplary zinc-rich coating in a liquid/suspension form may be PPG Industries ZNP-101 Organic Zinc Rich Primer, Spectracon® 611-1K Organic Zinc Rich Primer, having a composition of about thirty percent (30%) to sixty percent (60%) zinc powder by volume, about seven percent (7%) to about thirteen percent (13%) magnesium chloride by volume, about five percent (5%) to about ten percent (10%) Toluene by volume, about three percent (3%) to about seven percent (7%) butanone by volume, from about one percent (1%) to about five percent (5%) diacetone alcohol by volume, about one percent (1%) to about five percent (5%) Acetone by volume, about one percent (1%) to about five percent (5%) Zinc Oxide by volume, about one half percent (0.5%) to about one and a half percent (1.5%) Silica by volume, about zero point one percent (0.1%) to about one percent (1%) xylene by volume, and from about one-tenth percent (0.1%) to about one percent (1%) Ethylbenzene by volume. Another exemplary zinc-rich coating may be Geomet® 360 or Geomet® 720.

The zinc-rich coating applied from a liquid/suspension form may have a thickness that is at least about one thousandths of an inch (0.001") dry film thickness. The zinc-rich coating applied from a liquid/suspension form may be applied to the tone ring 124 in a thickness of from about two thousandths of an inch (0.002") to about six thousandths of an inch (0.006") wet film thickness. The zinc-rich coating applied from a liquid/suspension form may preferably be applied to the disc brake rotor 121, the tone ring 124, and/or other components associated with improved tone ring mounting structure 110 in a thickness of from about 22 ten thousandths of an inch (0.0022") to about five thousandths of an inch (0.005") wet film thickness. The zinc-rich coating applied from a liquid/suspension form may more preferably be applied to the disc brake rotor 121, the tone ring 124, and/or other components associated with improved tone ring mounting structure 110 in a thickness of from about 24 ten thousandths of an inch (0.0024") to about forty-five ten thousandths of an inch (0.0045").

The zinc-rich coating that is applied to the disc brake rotor 121, the tone ring 124, and/or other components associated with improved tone ring mounting structure 110 may include zinc-nickel alloy (Zn—Ni) coatings with as much as about seventeen percent (17%) nickel that may be applied by any suitable method, such as electroplating. Such zinc-nickel alloy coatings preferable include a nickel concentration of from about twelve percent (12%) to about seventeen percent (17%) nickel by weight. The zinc-rich coating may also be a zinc-aluminium coating (Zn—Al) coating. A sealer coat may be applied over the zinc-rich coating.

In order to further minimize the formation of corrosion cells and rust-jacking, a suitable corrosion resistant sealer may be applied to internal thread 180 of the disc portion 122 and/or the external screw thread 162 of tone ring 124 prior to threaded engagement of the tone ring with the disc brake rotor. For example, the corrosion resistant sealer may be a wet zinc-rich coating, such as a zinc-rich primer, painted onto the external screw thread 162 and/or the internal thread 180 prior to threaded engagement of the tone ring 124 with the disc portion 122. The corrosion resistant sealer may fill any gap, void, or space that may exist between the external screw thread 162 and the internal thread 180. The corrosion resistant sealer prevents the entry of contaminants, such as water, brine, road spray, or other de-icing chemicals, between the internal thread 180 and the external screw thread 162 by capillary action of the contaminants. The corrosion resistant sealer may also be applied to the annular end surface 152 of tone ring 124 and/or the annular end surface 182 of the disc portion 122.

In addition, because the tone ring 124 is preferably formed of steel and the disc brake rotor 121 is typically cast from iron materials, such as gray iron, alloyed modified gray iron or compacted graphite iron, the materials thermally expand similarly during vehicle braking, which reduces the potential for the tone ring to become loosened from the disc portion 122 due to thermal expansion during vehicle braking.

By way of example according to another aspect of the disclosed subject matter, a disc brake rotor assembly 220 (FIGS. 12-16) incorporates a new and improved tone ring mounting structure 210. The disc brake rotor assembly 220 is intended for use on heavy-duty vehicles, such as trucks and/or trailers. The disc brake rotor assembly 220 includes a disc brake rotor 221, which is a wheel end assembly rotatable component that is mounted for rotation on an axle spindle (not shown), as is known. The disc brake rotor assembly 220 also includes an antilock braking system tone ring 224. The design and function of the disc brake rotor assembly 220 is similar to that of the disc brake rotor assembly 120 illustrated in FIGS. 5-11 and described above. The disc brake rotor assembly 220 has a different threaded arrangement that attaches the tone ring 224 to the disc brake rotor 221, which will be described below.

The tone ring 224 is fixedly mounted to the disc brake rotor 221. The tone ring 224 is mounted to an inboard end of the disc brake rotor 221. Use of the improved tone ring mounting structure 210, according to the subject disclosure, reduces corrosion issues and enables the tone ring 224 to more easily be replaced on the disc brake rotor 221, if needed.

The disc brake rotor 221 includes the disc portion 222, a flange portion 226, and a sleeve portion 228 (FIGS. 12 and 14-16). The sleeve portion 228 is located between and connects the disc portion 222 and the flange portion 226 of the disc brake rotor 221. The disc portion 222, the flange portion 226, and the sleeve portion 228 may be integrally formed as one-piece. The disc brake rotor 221 may be cast from a suitable material, such as gray iron, alloyed modified gray iron or compacted graphite iron. The disc brake rotor 221 of the disc brake rotor assembly 220 is formed with features to accept a separate or discrete tone ring, such as tone ring 224.

The flange portion 226 of the disc brake rotor 221 may be formed with a plurality of radially extending bosses 230 and respective openings 232 formed in the bosses. The openings 232 receive mechanical fasteners, such as bolts or wheel studs (not shown), to removably secure the disc brake rotor assembly 220 to a wheel hub (not shown) of a wheel end assembly, as is known. The flange portion 226 may alternatively be formed as a continuous circular member containing the openings 232.

The disc portion 222 of the disc brake rotor 221 includes an outboard disc 240 and an inboard disc 242, which are spaced apart from one another along a longitudinal central axis A (FIG. 13-15) and are interconnected by a plurality of vanes or pins 244. The vanes or pins 244 are structural members that extend between the outboard disc 240 and the inboard disc 242 and are integrally cast with the outboard disc and the inboard disc. The vanes or pins 244 provide a rigid connection between the outboard disc 240 and the inboard disc 242, while creating radially-extending air passages 246 for cooling the disc portion 222, and thus the disc brake rotor 221. The outboard disc 240 and inboard disc 242 are each operationally located between a pair of brake pads (not shown), as is known.

The tone ring 224 includes a substantially annular body 250 (FIG. 15) formed preferably of a ferrous metal material, such as steel. Ferrous materials are preferred because they are capable of disrupting magnetic fields generated and detected by an associated antilock braking system sensor (not shown). It will be apparent, however, that the tone ring 224 may be made from any suitable material that has the capability of disrupting magnetic fields. It is to be understood that the tone ring 224 may be formed of a different material than the disc brake rotor 221.

The body 250 extends for a relatively short distance in a direction parallel to the longitudinal central axis A. The body 250 preferably is cut from a tubular member of readily available stock tubular steel. Using readily available stock tubular steel to form the body 250 provides significant economical and manufacturing advantages. Using steel for the tone ring 224 has further advantages. Steel is more robust than powdered metal and it avoids variable density that is often present in powdered metal and that can degrade corrosion resistance, impact strength and abrasion resistance.

Figure 15:
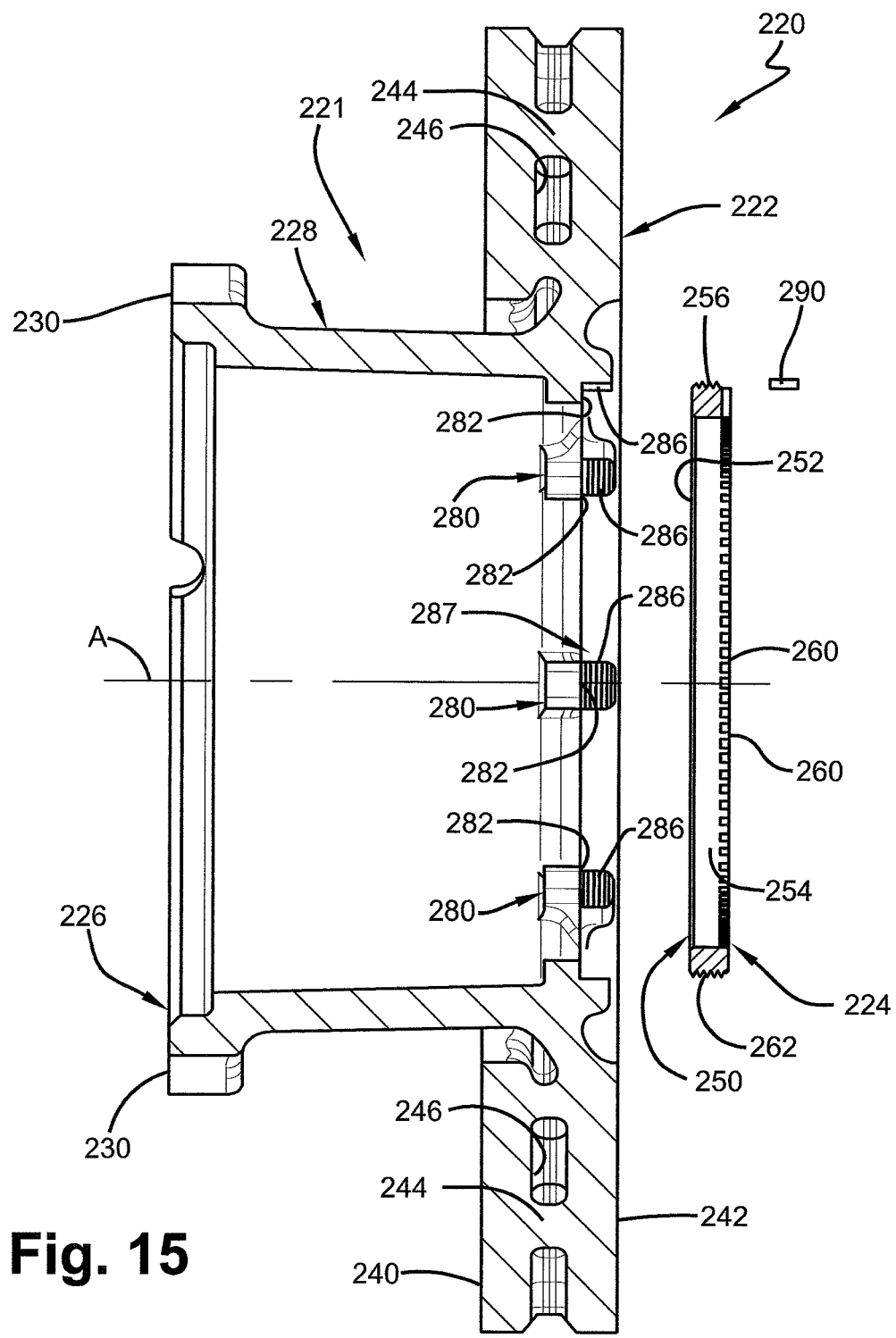
FIG. 15 is an exploded cross-sectional view, similar to FIG. 14, of the disc brake rotor assembly and tone ring mounting structure.
Figure 16:
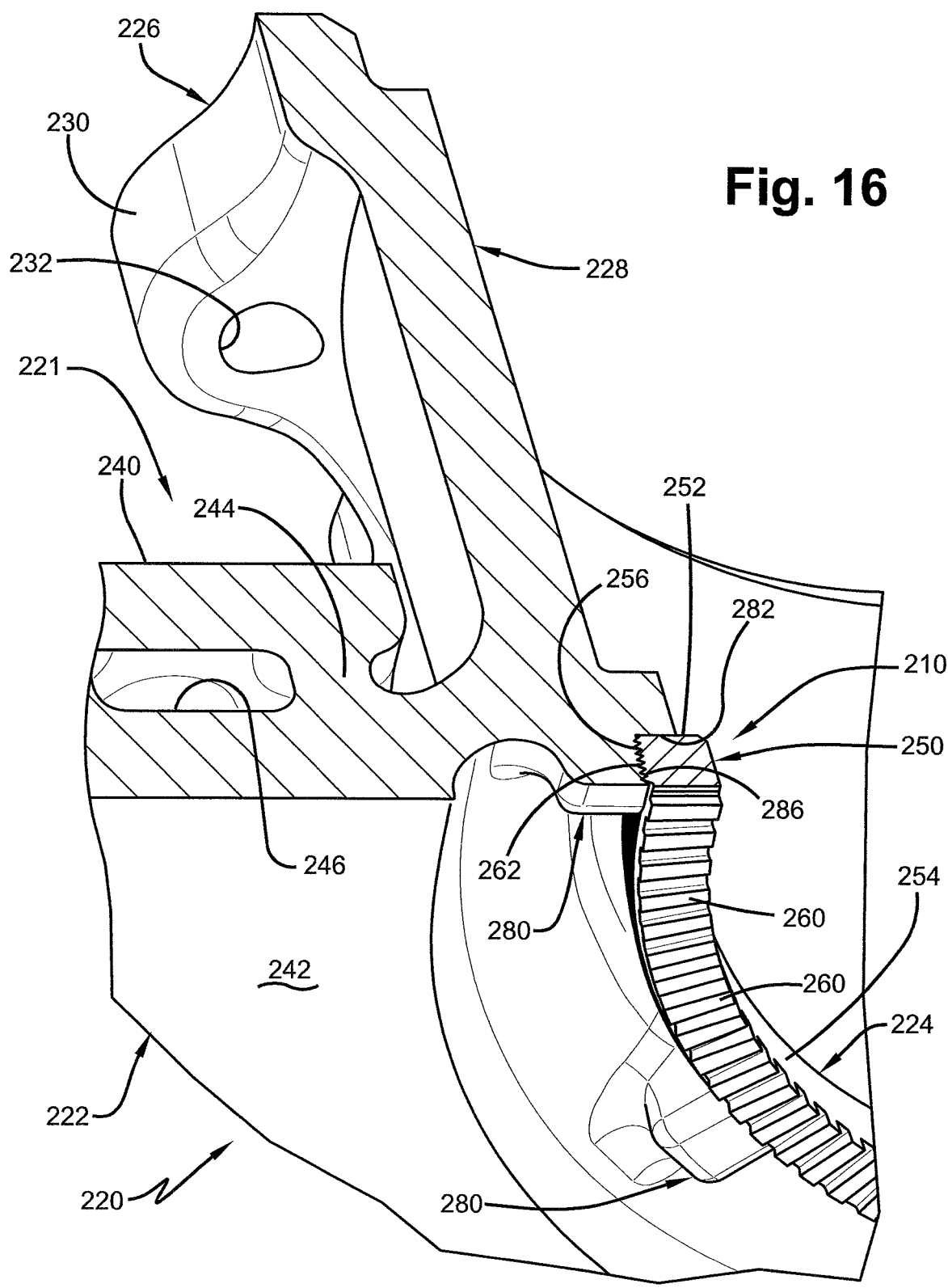
FIG. 16 is an enlarged fragmentary perspective view, partially in cross-section, of a portion of the disc brake rotor assembly and tone ring mounting structure illustrated in FIG. 12, showing the tone ring threaded into a plurality of discrete lugs of a disc brake rotor.

The body 250 includes an outboard facing planar annular end surface 252 (FIG. 15). The body 250 also has an inner cylindrical surface 254. The body 250 further has an external cylindrical surface 256 (FIG. 15).

Figure 13:
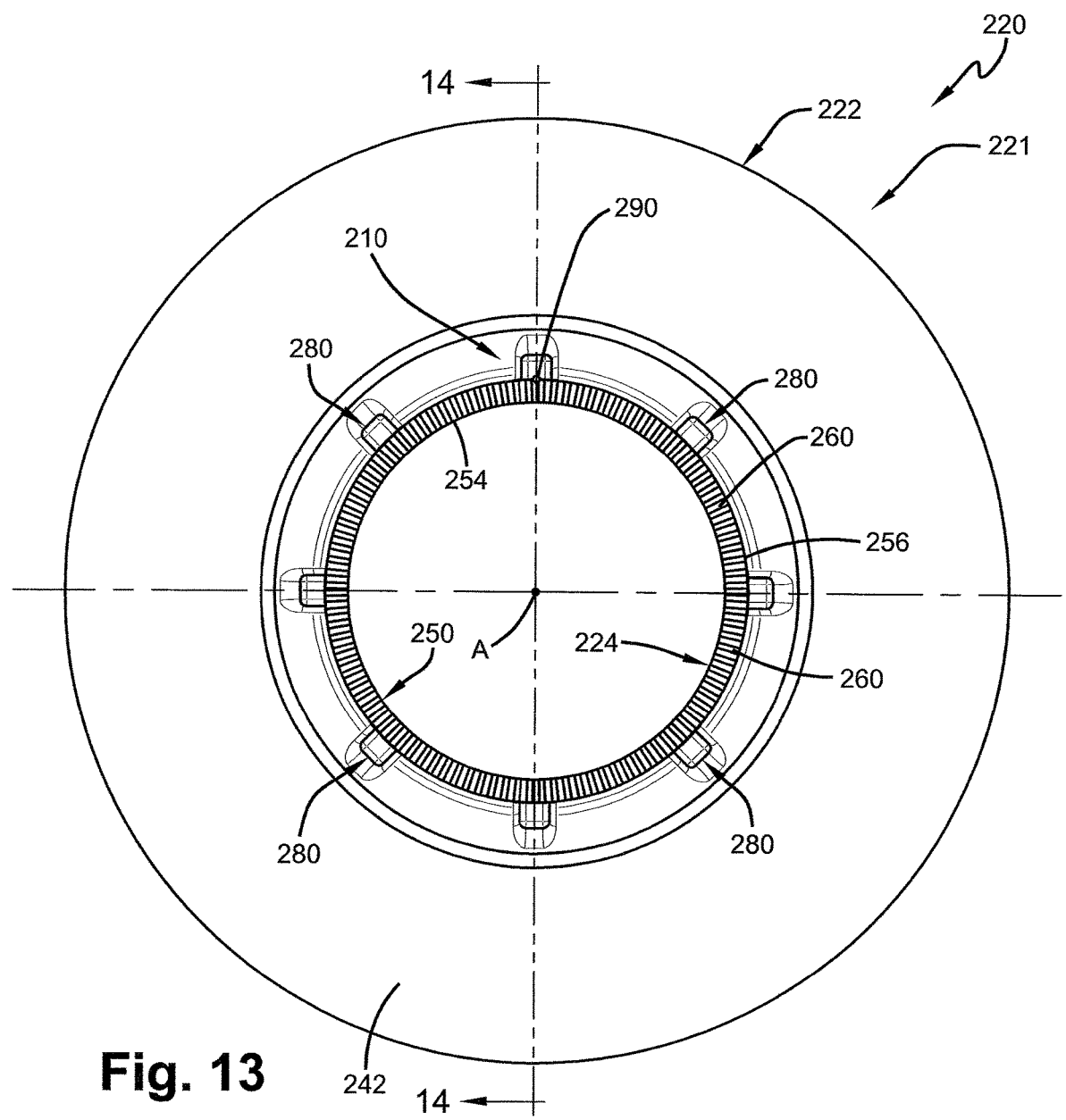
FIG. 13 is an elevational view of the disc brake rotor assembly and tone ring mounting structure illustrated in FIG. 12, viewed in an outboard direction.
Figure 14:
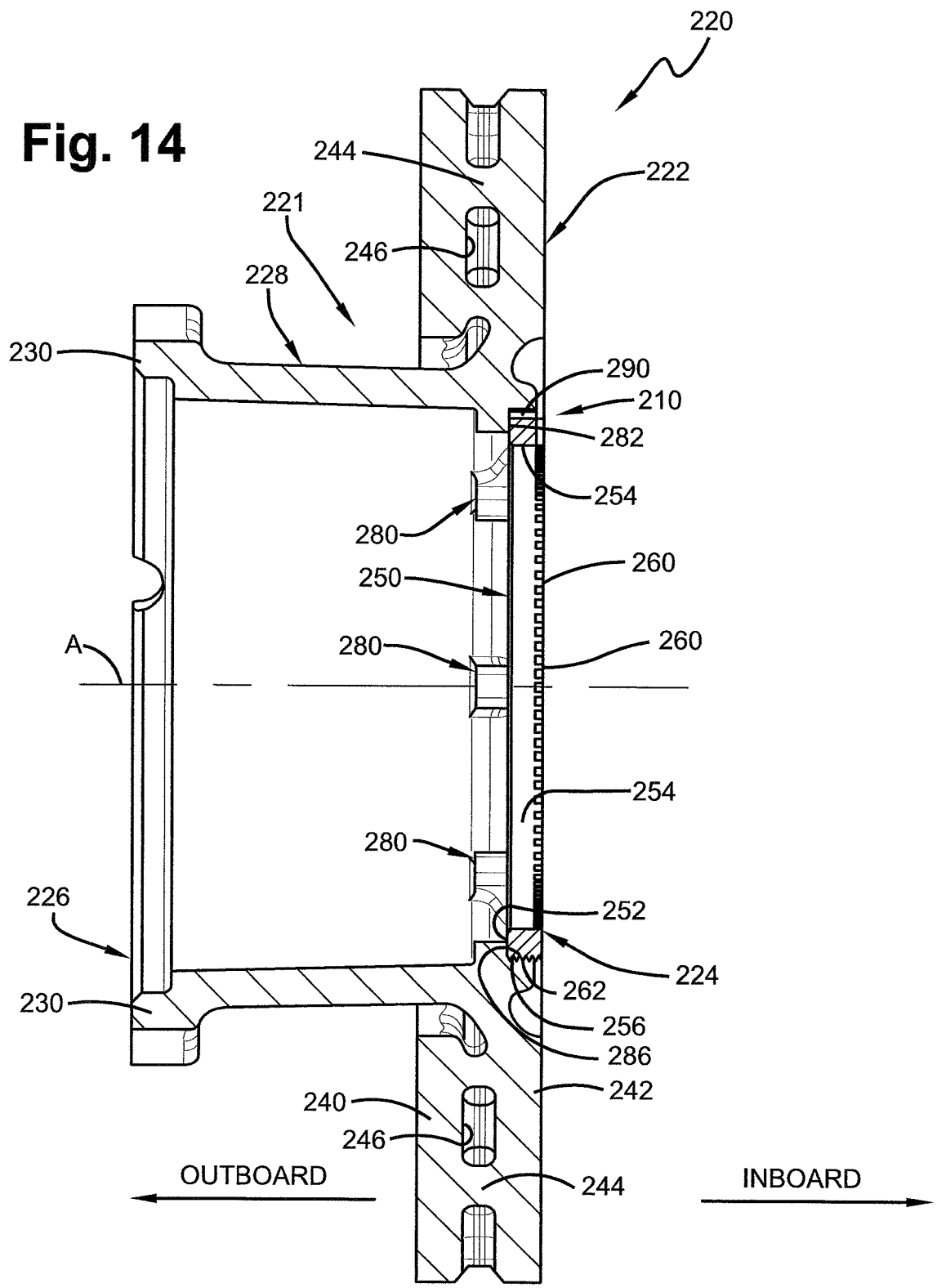
FIG. 14 is a cross-sectional view of the disc brake rotor assembly and tone ring mounting structure illustrated in FIG. 12, taken approximately along the line 14-14 in FIG. 13.

The tone ring 224 is formed with a plurality of circumferentially arrayed and axially extending teeth 260 (FIGS. 12-17), which can disrupt magnetic fields generated and detected by an antilock braking system sensor (not shown). The teeth 260 are spaced apart a known and equal distance. The teeth 260 of the tone ring 224 are formed in an inboard facing surface of the tone ring. It is to be understood that the teeth 260 of the tone ring 224 may be made from any suitable material that is capable of disrupting magnetic fields generated and detected by the antilock braking system sensor without affecting the overall concept or operation of the disclosed subject matter. It is also contemplated that the teeth 260 of the tone ring 224 may be circumferentially arrayed and radially extending or even at an acute angle relative to the axis A (FIGS. 13-15).

As is known, the antilock braking system sensor detects disruptions to the magnetic field and produces electrical signals representative of, for example, the time between sensing the presence of adjacent teeth 260. The electrical signals produced by the antilock braking system sensor are communicated to an electronic control unit (not shown) of the antilock braking system. The electronic control unit controls the antilock braking system between actuated and unactuated states under programmed conditions. As is known, the antilock braking system sensor would typically be attached to a component of the heavy-duty vehicle, such as an axle, in close proximity to the tone ring 224.

The improved tone ring mounting structure 210 (FIGS. 12-16) for attaching the tone ring 224 to the disc portion 222 of the disc brake rotor 221 includes an external screw thread 262 (FIGS. 12 and 14-16) formed in the external cylindrical surface 256 of the body 250. The external screw thread 262 may be formed with any suitable shape, tooth pitch, tooth depth and number of thread start positions, or other characteristics, without affecting the overall concept or operation of the disclosed subject matter. The external screw thread 262 may be formed to any axial extent along the external cylindrical surface 256 of the body 250 of the tone ring 224.

The improved tone ring mounting structure 210 for attaching the tone ring 224 to the disc portion 222 of the disc brake rotor 221 also includes a plurality of equally and circumferentially spaced lugs 280 (FIGS. 12-16) formed in the disc portion. In the illustrated example, eight lugs 280 are formed in the disc portion 222 of the disc brake rotor. It is to be understood that more or less than eight lugs can be formed in the disc portion 222 without affecting the overall concept or operation of the disclosed subject matter. Each of the lugs 280 is formed with a radially extending and inboard facing end surface 282 (FIG. 15). The end surfaces 282 collectively form non-continuous bottom surfaces or end surfaces in the disc portion 222 of the disc brake rotor 221 that are all located substantially in the same plane.

The improved tone ring mounting structure 210 further includes a portion of an internal thread 286 (FIGS. 14-16) formed on each of the lugs 280. Each portion of the internal thread 286 extends inboard along the longitudinal central axis A of the disc brake rotor assembly 220 from the disc portion 222 of the disc brake rotor 221 adjacent to the end surface 282. The portions of the internal threads 286 in combination form a non-continuous internal thread structure 287 (FIG. 15) in the disc portion 222 that matches and cooperates with the external screw thread 262 of the tone ring 224. The internal thread structure 287 made up of the portions of the internal threads 286 of the lugs 280 receives and threadably engages the external screw thread 262 of the tone ring 224.

During assembly of the disc brake rotor assembly 220, the external screw thread 262 of the tone ring 224 is threaded into the internal thread structure 287 of the disc portion 222. As the external screw thread 262 on the tone ring 224 is threaded into the internal thread structure 287 in the disc portion 222, the annular end surface 252 of the tone ring moves in a direction toward the end surfaces 282 in the disc portion. Upon sufficient relative rotation between the tone ring 224 and the disc portion 222 of the disc brake rotor 221, the annular end surface 252 of the tone ring engages at least one, and preferably all, of the end surfaces 282 of the lugs 280. The tone ring 224 can be tightened against the disc portion 222 so the annular end surface 252 and the end surfaces 282 are forced against one another by the wedging action of the threads so that virtually no spaces or gaps exist between the tone ring and the disc brake rotor 221. Thus, there is little or no space or gap for contaminants, such as water or chemical road treatments, to enter and cause corrosion cells that can evolve into rust-jacking and cause damage to the tone ring 224 and/or the disc brake rotor 221.

The tightening of the tone ring 224 into the disc portion 222 of the disc brake rotor 221 to cause engagement at the end surfaces 252, 282 of the tone ring and the lugs 280, respectively, prevents further relative rotation in the direction of tightening, such as clockwise if a right-handed thread arrangement is employed. It should be apparent that the thread 262 of the tone ring 224 may comprise an internal thread and the thread 286 of the lugs 280 of the disc portion 222 of the disc brake rotor 221 may comprise an external thread without affecting the overall concept or operation of the disclosed subject matter.

To prevent unintentional rotation of the tone ring 224 in a direction of loosening relative to the disc portion 222 of the disc brake rotor 221, such as counterclockwise if a right handed thread is employed, the improved tone ring mounting structure 210 includes a securing structure to prevent such relative rotation. More specifically, a metal cross pin 290 (FIGS. 12-15) is utilized to prevent rotation of the tone ring 224 relative to the disc portion 222. The cross pin 290 may fit tightly into at least partial corresponding openings formed in the disc portion 222 of the disc brake rotor 221 and the tone ring 224 threadably secured to the disc portion. For example, as illustrated in FIG. 13, the cross pin 290 could be tightly inserted into an opening formed at the threaded interface between the external thread 262 of the tone ring 224 and the internal thread 286 of one of the lugs 280 of the disc portion 222. The cross pin 290 essentially deforms a portion of both the external and internal threads 262, 286 and forms a positive barrier to prevent rotation of the tone ring 224 relative to the disc portion 222. It is also contemplated that the cross pin 290 may be inserted in other locations and directions that connect the disc portion 222 and the tone ring 224 to prevent relative rotation. For example a roll pin or set screw may extend radially through appropriate respective portions of the disc portion 222 and the tone ring 224. It is to be understood that threaded engagement of the tone ring 224 with the disc portion 222 of the disc brake rotor 221 at least inhibits rotation of the tone ring relative to the disc brake rotor once the tone ring is secured to the disc portion, with or without the cross pin 290 or other securing structure.

It should be noted that the disc brake rotor assembly 220 preferably has no portion of the lugs 280 of the disc portion 222 located axially inboard of the tone ring 224. The lugs 280 of the improved tone ring mounting structure 210 support and retain the tone ring 224 without cantilevered structure as in the prior art that could be damaged by rust-jacking. Thus, a significant advantage and service life can be achieved with the improved tone ring mounting structure 210 of the subject disclosure.

The tone ring 224 and/or the disc brake rotor 221 may be provided with a corrosion resistant coating to further resist the formation of corrosion cells. The tone ring 224 being made of steel has a further advantage over previously known powdered metal tone rings by providing better adhesion for a corrosion resistant coating to be applied. A corrosion resistant coating, such as a zinc-rich coating described above, and/or a corrosion resistant sealer, such as a wet zinc-rich primer described above, may be applied to the tone ring 224 and/or disc brake rotor 221. In addition, the tone ring 224 is formed of a material that thermally expands similarly to the lugs 280 of the disc brake portion 222 to prevent the tone ring from loosening or disengaging from the disc brake portion due to thermal expansion during vehicle braking and potentially causing the antilock braking system to become nonfunctional or unreliable.

Figure 17:
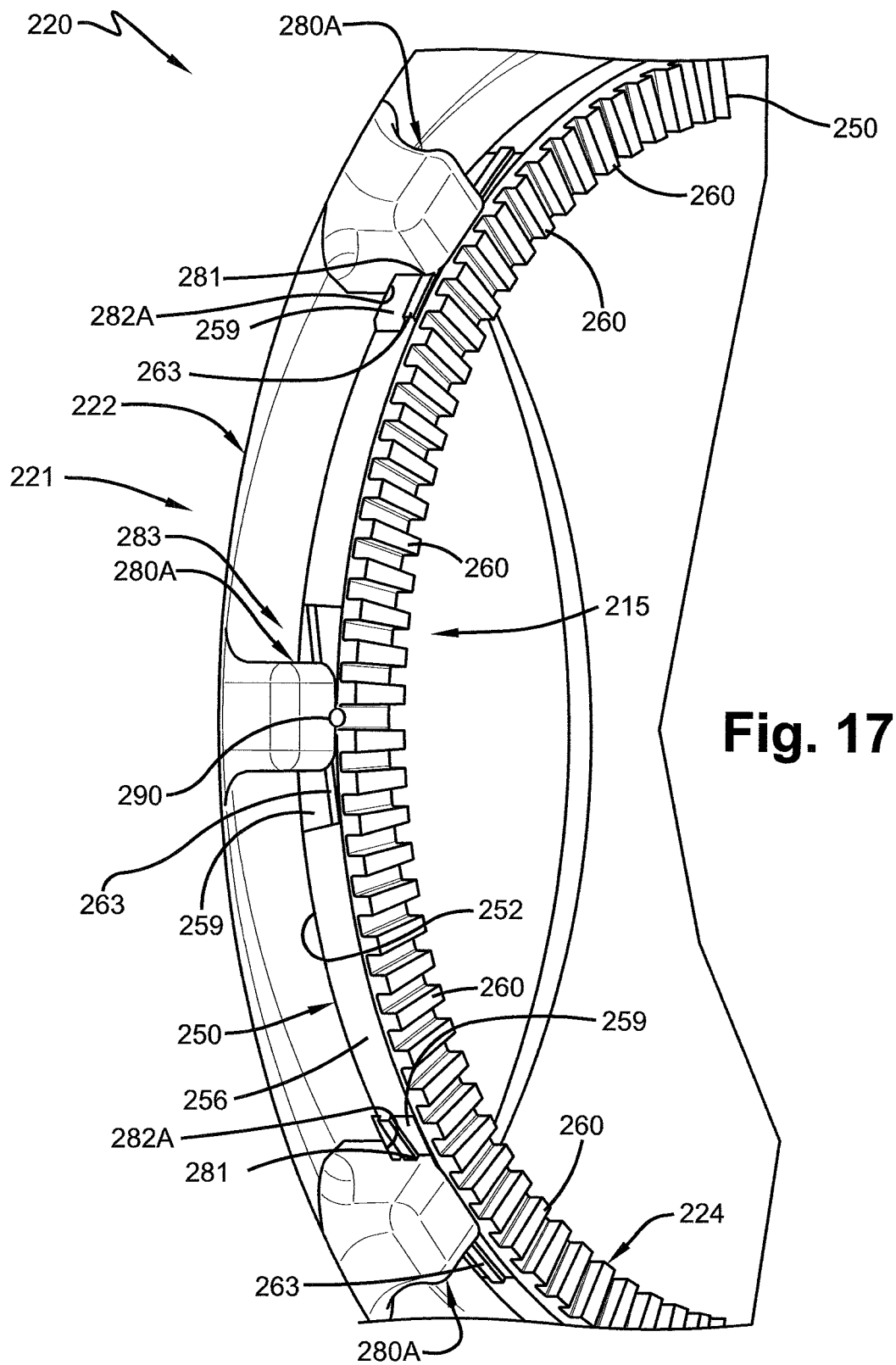
FIG. 17 is a fragmentary perspective view of a portion of the disc brake rotor assembly and tone ring mounting structure of FIG. 12, illustrating an alternative attachment configuration that may be formed on an external surface of the tone ring and wedged into a plurality of discrete lugs of a disc brake rotor.

An alternative configuration improved tone ring mounting structure 215 similar to the improved tone ring mounting structure 210 for attaching the tone ring 224 to the disc brake rotor 221 is illustrated in FIG. 17. The improved tone ring mounting structure 215 includes a plurality of bosses 259 formed on the external cylindrical surface 256 of the tone ring 224. The improved tone ring mounting structure 215 also includes a plurality of external wedge ramps 263 projecting radially outward from a respective boss 259 and extending at a relatively small acute angle relative to the annular end surface 252 of the tone ring 224. It should be apparent the external wedge ramps 263 could be formed directly on the external cylindrical surface 256 of the tone ring 224.

The improved tone ring mounting structure 215 also includes a plurality of equally and circumferentially spaced lugs 280A formed in the disc portion 222 of the disc brake rotor 221. Each of the lugs 280A is formed with a radially extending and inboard facing end surface 282A (FIG. 17). The end surfaces 282A collectively form non-continuous bottom surfaces or end surfaces in the disc portion 222 of the disc brake rotor 221 that are all located substantially in the same plane. The improved tone ring mounting structure 215 further includes an internal groove or wedge ramp 281 formed on each of the lugs 280A and that approximates the shape and angle of the external wedge ramp 263. The internal groove or wedge ramp 281 in combination form a portion of a non-continuous thread-like or wedging structure 283 in the disc portion 222 of the disc brake rotor 221 that matches and cooperates with the external wedge ramps 263 of the tone ring 224.

Upon rotation of the tone ring 224 relative to the disc portion 222, the internal groove or wedge ramp 281 of each lug 280A receives and/or engages a respective external wedge ramp 263 of the tone ring 224 to move the annular end surface 252 of the tone ring 224 in a direction toward the respective end surfaces 282A of the lugs 280A. Upon sufficient relative rotation between the tone ring 224 and the disc portion 222 of the disc brake rotor 221, the annular end surface 252 of the tone ring is wedged against respective end surfaces 282A of the lugs 280A and prevents further relative rotation in a first direction. Suitable securing structure, such as the cross pin 290, may be employed to prevent relative rotation in a second opposite direction. It is to be understood that threaded engagement of the tone ring 224 with the disc portion 222 of the disc brake rotor 221 via the external wedge ramps 263 and the internal grooves or wedge ramps 281 at least inhibits rotation of the tone ring relative to the disc brake rotor once the tone ring is secured to the disc portion, with or without the cross pin 290 or other securing structure.

It should be noted that the disc brake rotor assembly 220 has no portion of the lugs 280A of the disc portion 222 of the disc brake rotor 221 located axially inboard of the tone ring 224. The lugs 280A of the improved tone ring mounting structure 215 support and retain the tone ring 224 without cantilevered structure as in the prior art that could be damaged by rust-jacking. Thus, a significant advantage and service life can be achieved with the improved tone ring mounting structure 215 of the subject disclosure.

The disc brake rotor assembly 220 operates in a harsh environment under the vehicle. Contaminants, such as water, brine, road spray or various road salts, or other de-icing agents, can splash onto the disc brake rotor assembly 220 during operation of the heavy-duty vehicle. In order to further minimize the formation of corrosion cells and rust-jacking, the disc brake rotor 221, the tone ring 224, and/or other components associated with the improved tone ring mounting structure 215, may be provided with a corrosion resistant coating or treatment, such as a zinc-rich coating described above, and/or a corrosion resistant sealer, such as a wet zinc-rich primer described above. In addition, the tone ring 224 is formed of a material that thermally expands similarly to the lugs 280A of the disc brake portion 222 to prevent the tone ring from loosening or disengaging from the disc brake portion due to thermal expansion during vehicle braking and potentially causing the antilock braking system to become nonfunctional or unreliable.

By way of example according to yet another aspect of the disclosed subject matter, a wheel hub assembly 320 (FIGS. 18 and 20-21) which incorporates a new and improved tone ring mounting structure 310 is intended for use on heavy-duty vehicles, such as trucks and/or trailers. Wheel hub assembly 320 may be used on heavy-duty vehicles incorporating a drum brake system or a disc brake system that includes a hub-mounted tone ring. The wheel hub assembly 320 includes a wheel hub 322 and an antilock braking system tone ring 324. The tone ring 324 is mounted to an inboard end of the wheel hub 322.

The wheel hub 322 is a wheel end assembly rotatable component mounted on bearings (not shown) for relative rotation on an axle spindle (not shown), as is known. The wheel hub 322 has a barrel wall section 330. A hubcap (not shown) may be mounted on an outboard end portion 332 of the wheel hub 322 in a known manner. A flange 334 extends radially outward from the barrel wall section 330 of the wheel hub 322. Openings 336 are formed in the flange 334. Each of the openings 336 receives a respective wheel mounting stud 338, as is known. A brake drum (not shown) and a tire and wheel assembly (not shown) may be mounted to the flange 334 via the wheel mounting studs 338 and retained thereto by fastening nuts (not shown). The wheel hub 322 is typically cast as one-piece from ductile iron, austempered ductile iron (ADI) or aluminum, and is then machined.

Figure 18:
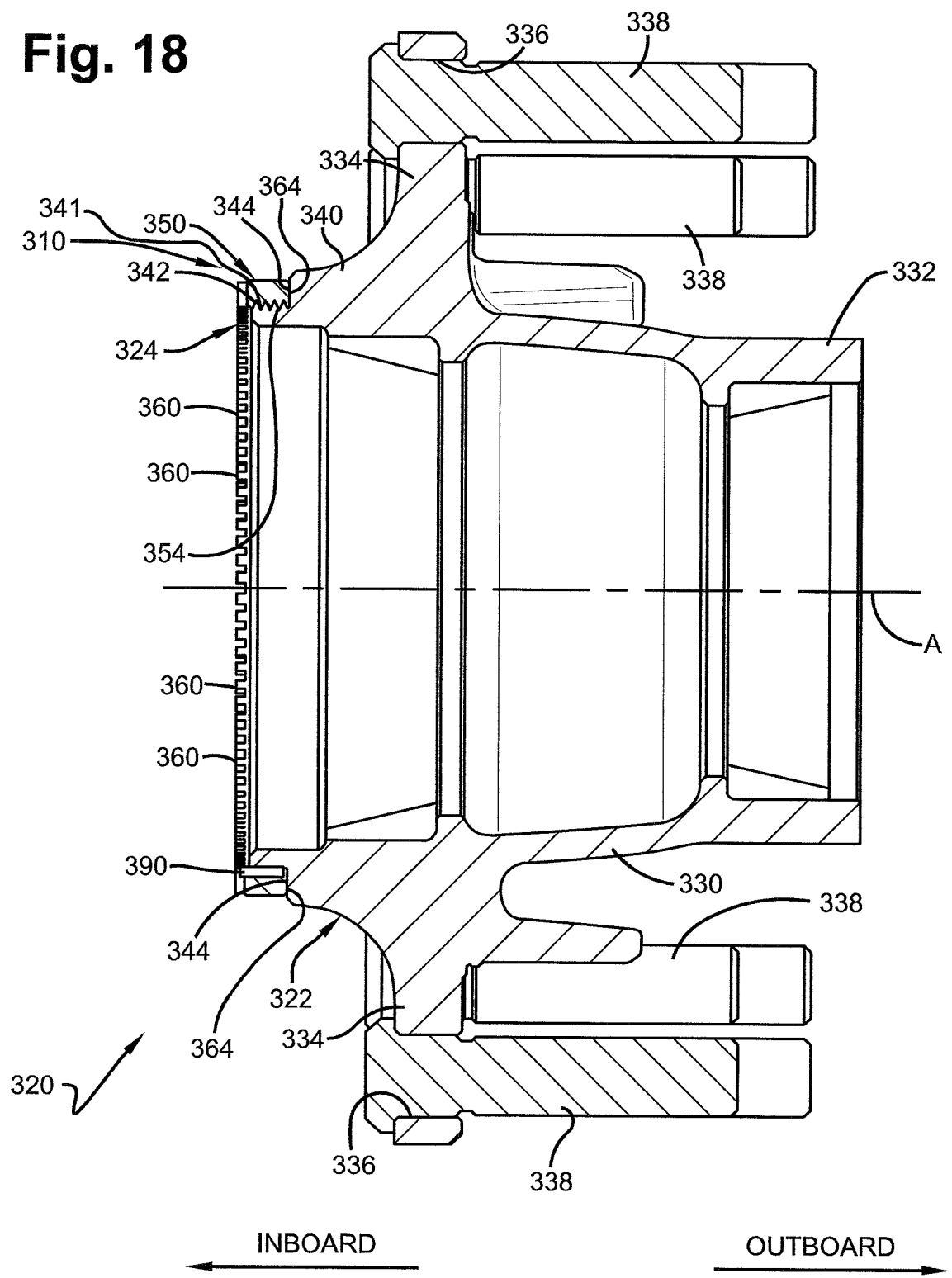
FIG. 18 is a cross-sectional view of a wheel hub assembly incorporating a tone ring mounting structure, according to yet another aspect of the disclosed subject matter, for use with an antilock braking system of a heavy-duty vehicle.

The tone ring 324 includes a substantially annular body 350 formed of a ferrous metal material, such as steel. Ferrous materials are preferred because they are capable of disrupting magnetic fields that are generated and detected by an associated antilock braking system sensor (not shown). It will be apparent, however, that the tone ring 324 may be made from any suitable material that is capable of disrupting magnetic fields. The body 350 extends for a relatively short distance in a direction coaxial with a longitudinal central axis A (FIG. 18). The body 350 is preferably cut from a tubular member of readily available stock tubular steel. Using readily available stock tubular steel to form the body 350 provides significant economical and manufacturing advantages. Using steel for the tone ring 324 has further advantages. Steel is more robust than powdered metal and it avoids variable density that is often present in powdered metal and that can degrade corrosion resistance, impact strength and abrasion resistance.

The body 350 of the tone ring 324 includes an outboard facing planar first annular end surface 364. The body 350 further has an external cylindrical surface 356 and an inner cylindrical surface 354.

The tone ring 324 is formed with a plurality of circumferentially arrayed and axially extending teeth 360, which can disrupt magnetic fields detected and generated by an antilock braking system sensor (not shown). The teeth 360 are evenly spaced apart a known distance. The teeth 360 of the tone ring 324 are preferably formed in an inboard facing surface of the body 350 of the tone ring. The teeth 360 may be formed on the external cylindrical surface 356 of the tone ring 324. It will be apparent that the teeth 360 of the tone ring 324 may be made from any suitable material that is capable of disrupting magnetic fields generated and detected by the antilock braking system sensor without affecting the overall concept or operation of the disclosed subject matter.

As is known, the antilock braking system sensor detects disruptions to the magnetic field and produces electrical signals representative of, for example, the time between sensing the presence of adjacent teeth 360. The electrical signals produced by the antilock braking system sensor are communicated to an electronic control unit (not shown) of the antilock braking system. The electronic control unit controls the antilock braking system between actuated and unactuated states under programmed conditions. As is known, the antilock braking system sensor would be attached to a component of the heavy-duty vehicle, such as an axle, in close proximity to the tone ring 324.

Figure 19:
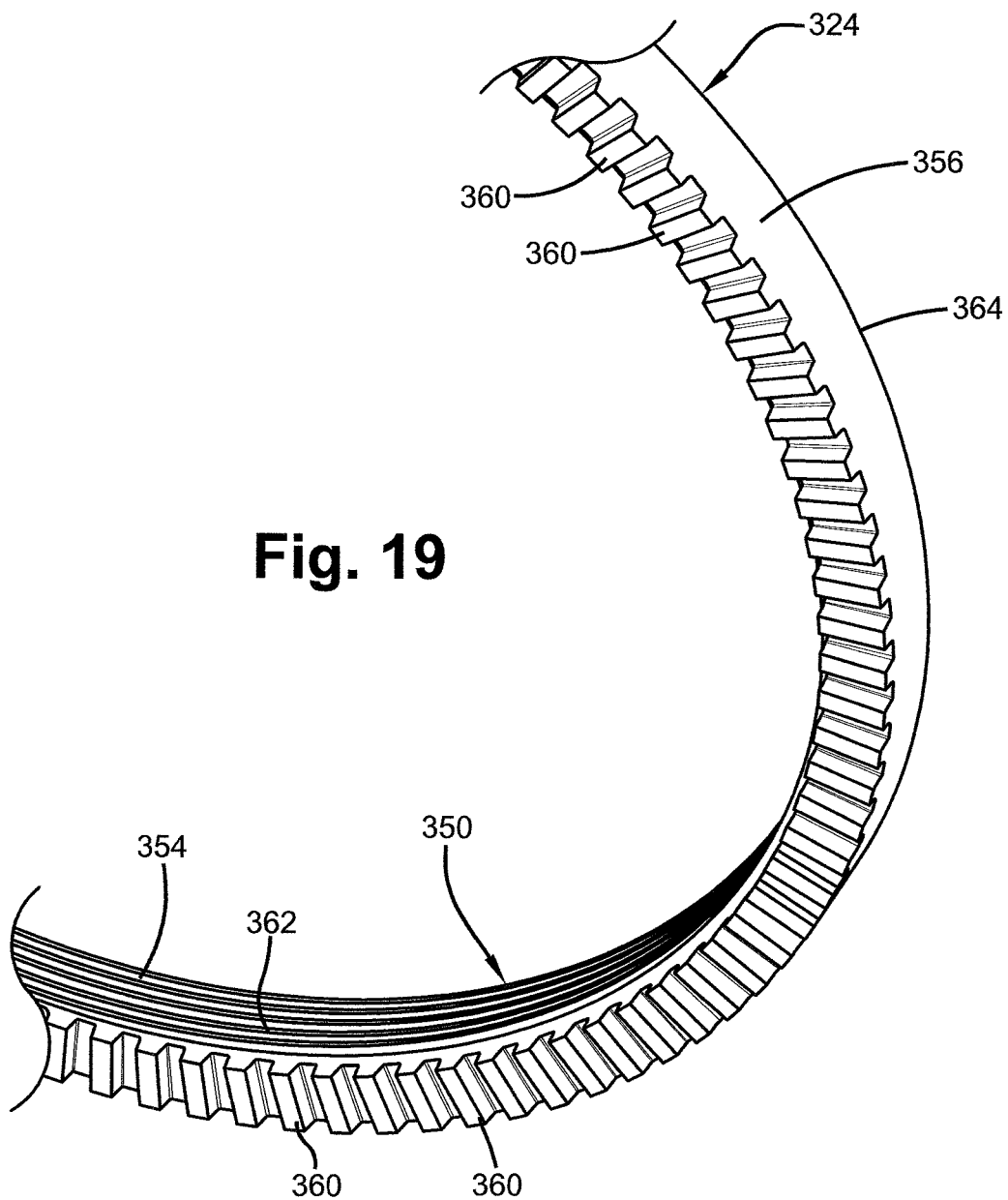
FIG. 19 is an enlarged perspective view of a portion of the tone ring of FIG. 18, illustrating a thread formed on an internal surface of the tone ring.

The improved tone ring mounting structure 310 for attaching the tone ring 324 to the wheel hub 322 includes an internal screw thread 362 (FIGS. 18 and 19) formed in the inner cylindrical surface 354 of the body 350 of the tone ring. The tone ring 324 is formed with the internal screw thread 362 at least partially formed on the inner cylindrical surface 354. The internal screw thread 362 may be formed with any suitable shape, tooth pitch, tooth depth and number of thread start positions, or other characteristics, without affecting the overall concept or operation of the disclosed subject matter. The internal screw thread 362 may be formed to any axial extent along the inner cylindrical surface 354 of the tone ring 324.

The improved tone ring mounting structure 310 also includes an external thread 342 (FIG. 18) formed on an external circumferential surface 341 (FIG. 18) of the inboard end portion 340 of the wheel hub 322. The external thread 342 may be formed with any suitable shape, tooth pitch, tooth depth and number of thread start positions, or other characteristics, without affecting the overall concept or operation of the disclosed subject matter. The external thread 342 may be formed to any appropriate axial extent along the inboard end portion 340 of the wheel hub 322. The wheel hub 322 also has a radially extending inboard facing first annular end surface 344 (FIG. 18) located adjacent the external thread 342. The external thread 342 of the wheel hub 322 matches and cooperates with the internal screw thread 362 of the tone ring 324. The external thread 342 of the wheel hub 322 receives and threadably engages the internal screw thread 362 of the tone ring 324.

As the internal screw thread 362 on the tone ring 324 is threaded onto the external thread 342 on the wheel hub 322, the first annular end surface 364 of the tone ring moves in a direction toward the first annular end surface 344 of the wheel hub 322. Upon sufficient rotation of the tone ring 324 relative to the wheel hub 322, the first annular end surface 364 of the tone ring engages the first annular end surface 344 of the wheel hub. The tone ring 324 can be tightened against the wheel hub 322 so the first annular end surface 364 and the first annular end surface 344 are forced against one another by the wedging action of being threaded so that virtually no space or gap exists between the tone ring and the wheel hub. Thus, there is little or no space or gap in the engagement area located radially outward of the threads 342, 362 for contaminants, such as water or chemical road treatments, to enter and cause corrosion cells that can evolve into rust-jacking and cause damage to the tone ring 324 and/or the wheel hub 322. The tightening of the tone ring 324 into the wheel hub 322 to cause engagement at the first annular end surfaces 344, 364 prevents further relative rotation in the direction of tightening, such as clockwise if a right-handed thread is employed.

Figure 20:
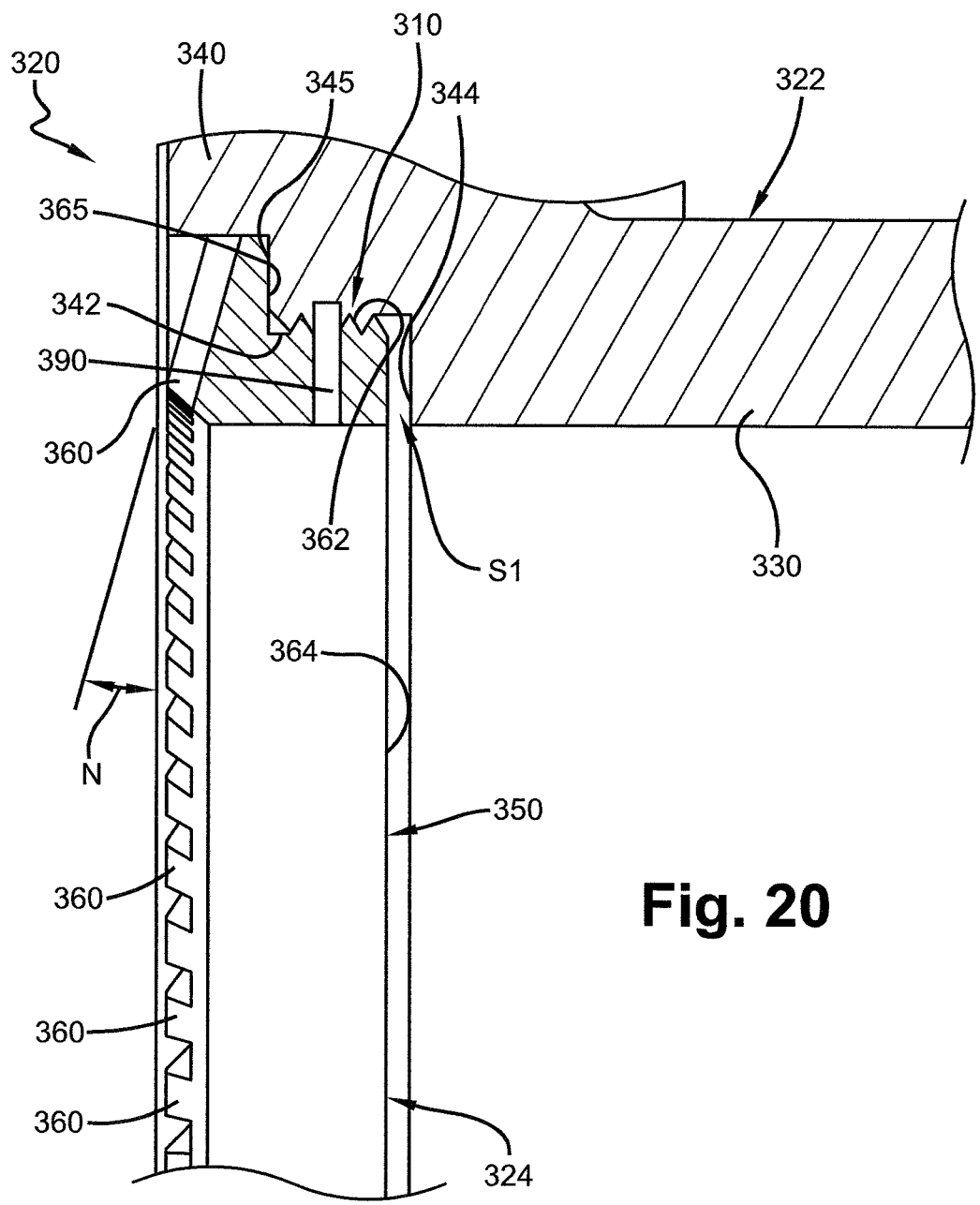
FIG. 20 is an enlarged fragmentary cross-sectional view of a portion of the wheel hub assembly and tone ring mounting structure of FIG. 18, illustrating the tone ring threaded into the wheel hub according to an alternative construction.
Figure 21:
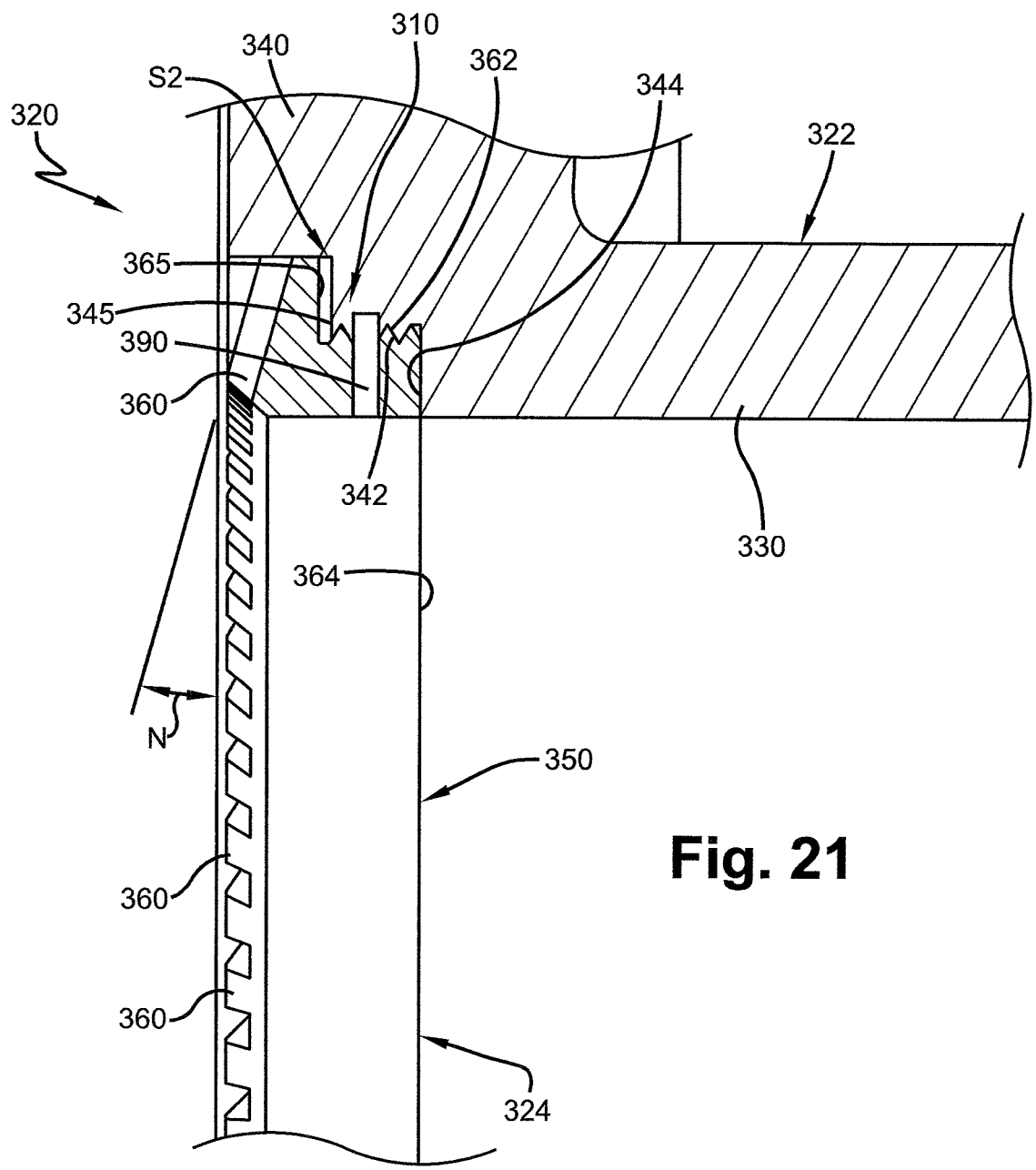
FIG. 21 is an enlarged fragmentary cross-sectional view, similar to FIG. 20, of a portion of the wheel hub assembly and tone ring mounting structure of FIG. 18, according to another alternative construction.

Alternatively, the screw thread 362 of the tone ring 324 may be formed on an external surface of the tone ring and the thread 342 of the wheel hub 322 formed on an internal surface of the wheel hub, as is illustrated in FIGS. 20 and 21. In such configurations of improved tone ring mounting structure 310, the wheel hub 322 may also include a second radially extending inboard facing annular end surface 345 (FIGS. 20 and 21) adjacent the now internal thread 342 and axially spaced from the first annular end surface 344. In such an alternative configuration, the body 350 of the tone ring 324 can also include a planar second annular end surface 365 axially spaced from the first annular end surface 364 which corresponds to the second annular end surface 345 of the wheel hub 322. It is to be understood that disc brake rotors 121 and 221 can similarly include second radially extending inboard facing annular end surfaces (not shown) axially spaced from their respective first annular end surfaces 182 and 282. In such instances, the tone rings 124 and 224 can also include planar second annular end surfaces (not shown) axially spaced from their respective first annular end surfaces 152 and 252 that correspond to the second radially extending inboard facing surfaces of the disc brake rotors 121 and 221. The teeth 360 of tone ring 324 may be oriented at an angle N relative to the axis A (FIG. 20-21) or be formed on the inner cylindrical surface 354 of the tone ring 324. It is to be understood that teeth 160 and 260 of tone rings 124 and 224, respectively, could also be angled relative to axis A without affecting the overall concept or operation of the disclosed subject matter.

As the external screw thread 362 on the tone ring 324 is threaded into the internal thread 342 on the wheel hub 322, the first annular end surface 364 of the tone ring moves in a direction toward the first annular end surface 344 of the wheel hub 322 and the second annular end surface 365 of the tone ring moves in a direction toward the second annular end surface 345 of the wheel hub. Upon sufficient rotation of the tone ring 324 relative to the wheel hub 322, the first annular end surface 364 of the tone ring engages the first annular end surface 344 of the wheel hub or the second annular end surface 365 of the tone ring engages the second annular end surface of 345 of the wheel hub. The tone ring 324 can be tightened against the wheel hub 322 so the first annular end surface 364 and the first annular end surface 344, or the second annular end surface 365 and the second annular end surface 345, are forced against one another by the wedging action of being threaded so that preferably virtually no space or gap exists between the tone ring and the wheel hub.

A space S1 (FIG. 20) may exist between the first annular end surface 344 of the wheel hub 322 and the first annular end surface 364 of the tone ring 324. The space S1 is located in an area where corrosion, if corrosion should occur, would have little or no effect on the improved tone ring mounting structure 310 or cause loosening of the tone ring 324 due to the strength of the external screw thread 362 on the tone ring and the internal thread 342 on the wheel hub 322.

A space S2 (FIG. 21) may also exist between the second annular end surface 345 of the wheel hub 322 and the second annular end surface 365 of the tone ring 324. The space S2 is also located in an area where corrosion, if corrosion should occur, would have little or no effect on the improved tone ring mounting structure 310 or cause loosening of the tone ring 324 due to the strength of the external screw thread 362 on the tone ring and the internal thread 342 on the wheel hub 322.

To prevent unintentional relative rotation of the tone ring 324 in a direction of loosening relative to the wheel hub 322, such as counterclockwise if a right handed thread is employed, improved tone ring mounting structure 310 includes a securing structure to prevent such relative rotation. More specifically, a metal cross pin 390 (FIGS. 18 and 20-21) is utilized to prevent rotation of the tone ring 324 relative to the wheel hub 322. The cross pin 390 may fit tightly into at least partial corresponding openings formed in the wheel hub 322 and the tone ring 324 (FIG. 18). The cross pin 390 could be inserted radially through respective openings formed in the tone ring 324 and the wheel hub 322 (FIGS. 20-21) or axially as illustrated in FIG. 18. The cross pin 390 fits tightly in openings in the tone ring 324 and the wheel hub 322 and forms a positive barrier to prevent rotation of the tone ring 324 relative to the wheel hub 322 once installed. The cross pin 390 could be inserted in other locations and directions that connect the wheel hub 322 and the tone ring 324. It is to be understood that threaded engagement of the tone ring 324 with the wheel hub 322 at least inhibits rotation of the tone ring relative to the wheel hub once the tone ring is secured to the wheel hub, with or without the cross pin 390 or other securing structure.

It should be noted that the wheel hub assembly 320 has no portion of the wheel hub 322 located axially inboard of, and partially surrounding, the tone ring 324 that is cantilevered in such a manner that could cause damage by rust-jacking. Further, there is no structure extending radially from the tone ring 324 which could add to manufacturing complexity and cost. Thus, a significant advantage and service life can be achieved with the improved tone ring mounting structure 310 of the subject disclosure.

The wheel hub assembly 320 operates in a harsh environment under the vehicle. Contaminants, such as water, brine, road spray or various road salts, or other de-icing agents, can splash onto the wheel hub assembly 320 during operation of the heavy-duty vehicle. A corrosion resistant coating or treatment and/or a corrosion resistant sealer, such as those described above, can be applied to the tone ring 324, the wheel hub 322, and/or other components associated with improved tone ring mounting structure 310. The coating or treatment may be a zinc-rich coating applied to all surfaces of the wheel hub 322 and/or the tone ring 324, or selected surfaces or portions of those components. In addition, the tone ring 324 is formed of a material that thermally expands similarly to wheel hub 322 to prevent the tone ring from loosening or disengaging from the wheel hub due to thermal expansion during vehicle braking and potentially causing the antilock braking system to become nonfunctional or unreliable. Use of the tone ring 324, a discrete component, according to the subject disclosure, reduces corrosion issues, enables the tone ring to more easily be replaced on the wheel hub 322, if needed, and avoids variable density that is often present in powdered metal that can degrade corrosion resistance, impact strength and abrasion resistance.

It is to be understood that the wheel hub 322 may be formed with lugs, similar to the lugs 280, 280A described above, for receiving the tone ring 324 without affecting the overall concept or operation of the disclosed subject matter.

According to yet another aspect, a method of manufacturing a wheel end assembly is employed. The method would provide a wheel end assembly rotatable component, such as the disc brake rotor 121, 221 or the wheel hub 322. The wheel end assembly rotatable component has at least one radially extending first end surface and a first thread extending radially from the wheel end assembly rotatable component. A tone ring, such as the tone rings 124, 224 or 324, is formed with a radially extending second end surface and a second thread extending radially from the tone ring is provided. The second thread of the tone ring is threaded into the first thread of the wheel end assembly rotatable component. The second end surface is moved in a direction toward the first end surface during the threading step.

Providing the tone ring further includes cutting a blank from tubular material. A plurality of teeth is formed on an axial end surface of the blank. A thread is formed on a cylindrical surface of the blank. At least a portion of the wheel end assembly rotatable component and/or the tone ring may then be coated with a corrosion resistant coating or treatment. The corrosion resistant coating may be a zinc-rich coating, such as that described above. The zinc-rich coating may be a zinc-nickel alloy with a concentration of up to about seventeen percent (17%) nickel by weight, and preferably between about twelve percent (12%) to about seventeen percent (17%) nickel by weight.

The threading and moving steps further includes moving the second end surface against the first end surface to inhibit relative axial movement in a first direction and relative rotational movement between the tone ring and the wheel end assembly rotatable component. A corrosion resistant sealer may be applied to the first thread of the wheel end assembly rotatable component and/or the second thread of the tone ring prior to threaded engagement of the second thread with the first thread. The corrosion resistant sealer may be a wet zinc-rich primer. The method further includes the step of introducing securing structure to maintain a relative rotational position between the tone ring and the rotatable component. The corrosion resistant sealer may also be applied to the securing structure.

It is to be understood that the structure and arrangement of the disclosed subject matter may be altered or rearranged without affecting the overall concept or operation of the invention. Moreover, while reference herein has been made generally to a heavy-duty vehicle for the purpose of convenience, it has been with the understanding that such reference includes at least trucks, tractor-trailers and semi-trailers, or other similar vehicles. The concept of the disclosed subject matter may also be employed with virtually any type of vehicle that utilizes an antilock braking system, including passenger cars. The improved tone ring mounting structure of the disclosed subject matter may be employed in various configurations including disc brakes, disc brake rotors, drum brakes and/or wheel hubs. It is to be understood that the various configurations of the wheel end assembly rotatable component and/or the tone ring may have a continuous thread or discontinuous thread portions without affecting the overall concept or operation of the disclosed subject matter. It is also to be understood that the wheel end assembly rotatable component and/or the tone ring could be formed with an external thread and/or an internal thread without affecting the overall concept or operation of the disclosed subject matter. Accordingly, the improved tone ring mounting structure for heavy-duty vehicles of the subject disclosure is simplified, provides an effective, safe, inexpensive, and efficient structure which provides for eliminating difficulties encountered with prior art tone ring mounting structure, solves problems and obtains new results.

In the foregoing description, certain terms have been used for brevity, clarity and understanding, but no unnecessary limitations are to be implied because such terms are used for descriptive purposes and are intended to be broadly construed. Moreover, the subject disclosure has been described with reference to exemplary aspects. It shall be understood that this description is by way of example and not by way of limitation, as the scope of the subject disclosure is not limited to the exact details shown or described. Potential modifications and alterations will occur to others upon a reading and understanding of this disclosure, and it is understood that the invention includes all such modifications and alterations and equivalents thereof.

What is claimed is:

1. Tone ring mounting structure for an antilock braking system, the tone ring mounting structure comprising:
   a disc brake rotor having at least one first axial end surface and a first engagement mechanism, said first engagement mechanism extending radially and non-cantilevered from said disc brake rotor; and
   a tone ring formed with at least one second axial end surface and a second engagement mechanism, said second engagement mechanism extending radially from said tone ring, wherein connecting engagement of the first engagement mechanism of the disc brake rotor and the second engagement mechanism of the tone ring moves said at least one second axial end surface in a direction toward said at least one first axial end surface.

2. The tone ring mounting structure of claim 1, wherein the connecting engagement further includes threaded engagement of the first engagement mechanism of the disc brake rotor and the second engagement mechanism of the tone ring, the threaded engagement forcing the at least one second axial end surface against the at least one first axial end surface to inhibit relative axial movement in a first direction and relative rotational movement between the tone ring and the disc brake rotor.

3. The tone ring mounting structure of claim 1, further including securing structure to prevent relative rotational movement between tone ring and the disc brake rotor.

4. The tone ring mounting structure of claim 3, wherein the securing structure comprises a device connecting the tone ring and the disc brake rotor.

5. The tone ring mounting structure of claim 4, wherein the device comprises a pin inserted into a first partial opening of the disc brake rotor aligned with a second partial opening of the tone ring.

6. The tone ring mounting structure of claim 1, wherein the at least one first axial end surface is substantially annular.

7. The tone ring mounting structure of claim 1, wherein the at least one first axial end surface includes a plurality of axial end surfaces formed on a plurality of circumferentially spaced lugs formed on the disc brake rotor, the plurality of axial end surfaces extending substantially in a same plane.

8. The tone ring mounting structure of claim 1, wherein the first engagement mechanism comprises a first thread formed on the disc brake rotor and the second engagement mechanism of the tone ring comprises a second thread engageable with the first tread.

9. The tone ring mounting structure of claim 8, wherein the first thread of the disc brake rotor comprises an internal thread and the second thread of the tone ring comprises an external thread.

10. The tone ring mounting structure of claim 1, wherein the first engagement mechanism comprises at least one wedge or ramp groove formed in the wheel end assembly rotatable component and the second engagement mechanism comprises a wedge or ramp structure formed on the tone ring.

11. The tone ring mounting structure of claim 10, wherein the at least one wedge or ramp groove is formed in at least one lug of the wheel end assembly rotatable component.

12. The tone ring mounting structure of claim 1, wherein the tone ring is formed from tubular metal material.

13. The tone ring mounting structure of claim 12, wherein the tubular metal material is steel.

14. The tone ring mounting structure of claim 1, wherein at least a portion of at least one of the tone ring or the disc brake rotor includes a corrosion resistant coating or a corrosion resistant sealer.

15. The tone ring mounting structure of claim 14, wherein the corrosion resistant coating is a zinc-rich coating.

16. The tone ring mounting structure of claim 15, wherein the zinc-rich coating is an electroplated zinc-nickel alloy coating.

17. The tone ring mounting structure of claim 16, wherein the zinc-nickel alloy coating includes a nickel concentration of from about 12% to about 17% nickel by weight.

18. The tone ring mounting structure of claim 15, wherein the zinc-rich coating is a powder coating.

19. A method of manufacturing a wheel end assembly comprising:

providing a disc brake rotor with at least one first axial end surface and a first thread extending radially and non-cantilevered from said disc brake rotor;

providing a tone ring formed with at least one second axial end surface and a second thread extending radially from said tone ring;

threading said second thread of the tone ring into said first thread of the disc brake rotor; and moving said at least one second axial end surface in a direction toward said at least one first axial end surface during the threading step.

20. The method of manufacturing a wheel end assembly of claim 19, further including the step of moving the at least one second axial end surface against the at least one first axial end surface to inhibit relative axial movement in a first direction and relative rotational movement between the tone ring and the disc brake rotor.

21. The method of manufacturing a wheel end assembly of claim 19, further including the step of applying a corrosion resistant coating or a corrosion resistant sealer to at least one of the first thread and the second thread prior to threading the second thread into the first thread.

22. The method of manufacturing a wheel end assembly of claim 21, wherein the corrosion resistant sealer is a wet zinc-rich primer.

23. The method of manufacturing a wheel end assembly of claim 19, further including the step of introducing securing structure to prevent relative rotational movement between the tone ring and the disc brake rotor.

24. The method of manufacturing a wheel end assembly of claim 23, further including the step of applying a wet zinc-rich primer to the securing structure prior to introducing the securing structure to prevent relative rotational movement between the tone ring and the disc brake rotor.

25. The method of manufacturing a wheel end assembly of claim 19, wherein the providing the tone ring step further includes cutting a blank from tubular material, forming a plurality of teeth on an axial end surface of the blank and forming a thread on a cylindrical surface of the blank.

26. The method of manufacturing a wheel end assembly of claim 25, wherein the tubular material is steel.

27. Tone ring mounting structure for an antilock braking system for use with a heavy-duty vehicle, the tone ring mounting structure comprising:

a disc brake rotor having at least one axial end surface and a first thread extending radially and non-cantilevered from said disc brake rotor;

a tone ring formed with at least one second axial end surface and a second thread extending radially from said tone ring, wherein threaded engagement of said first thread of the disc brake rotor and said second thread of the tone ring moves said at least one second axial end surface in a direction toward said at least one first axial end surface so the at least one second axial end surface is forced against the at least one first axial end surface to inhibit relative axial movement in a first direction and relative rotational movement between said tone ring and said disc brake rotor; and securing structure to prevent relative rotational movement between the tone ring and the disc brake rotor.

28. The tone ring mounting structure of claim 27, wherein the tone ring is formed from tubular metal material.

29. The tone ring mounting structure of claim 28, wherein the tubular metal material is steel.

30. An attachment structure for a heavy-duty vehicle with an antilock braking system, the attachment structure comprising:

a disc brake rotor having at least one first axial end surface and a first engagement structure extending radially and non-cantilevered from said disc brake rotor;

a tone ring having a plurality of teeth for disrupting a magnetic field produced by an associated antilock braking system, said tone ring having a second engagement structure extending radially from the tone ring corresponding to said first engagement structure and at least one second axial end surface, wherein connecting engagement of the first engagement structure of the disc brake rotor and said second engagement structure of said tone ring moves said at least one second axial end surface in a direction toward said at least one first axial end surface, whereby the second engagement structure and said first engagement structure cooperate to secure the tone ring to said disc brake rotor and form an interface between said tone ring and the said disc brake rotor; and said interface having a wet zinc-rich coating, whereby said coating resists or prevents rust build-up at the interface.

* * * * *

UNITED STATES PATENT AND TRADEMARK OFFICE
CERTIFICATE OF CORRECTION

PATENT NO. : 11,131,355 B2  
APPLICATION NO. : 16/166290  
DATED : September 28, 2021  
INVENTOR(S) : White et al.

Page 1 of 1

It is certified that error appears in the above-identified patent and that said Letters Patent is hereby corrected as shown below:

In the Claims

Claim 10, Column 26, Lines 41, after the word "the" delete "wheel end assembly rotatable component" and insert --disc brake rotor--.

Claim 11, Column 26, Line 47, after the word "the" delete "wheel end assembly rotatable component" and insert --disc brake rotor--.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*